(12) United States Patent
Yamasaki

(10) Patent No.: US 11,801,887 B2
(45) Date of Patent: Oct. 31, 2023

(54) DRIVE DEVICE

(71) Applicant: DENSO CORPORATION, Kariya (JP)

(72) Inventor: Masashi Yamasaki, Kariya (JP)

(73) Assignee: DENSO CORPORATION, Kariya (JP)

( * ) Notice: Subject to any disclaimer, the term of this patent is extended or adjusted under 35 U.S.C. 154(b) by 609 days.

(21) Appl. No.: 17/034,336

(22) Filed: Sep. 28, 2020

(65) Prior Publication Data

US 2021/0009192 A1    Jan. 14, 2021

Related U.S. Application Data

(63) Continuation of application No. PCT/JP2019/015271, filed on Apr. 8, 2019.

(30) Foreign Application Priority Data

Apr. 10, 2018 (JP) ................................. 2018-075412

(51) Int. Cl.
*B62D 5/04* (2006.01)
*H02K 5/22* (2006.01)
*H02K 11/33* (2016.01)

(52) U.S. Cl.
CPC ........... *B62D 5/0403* (2013.01); *B62D 5/046* (2013.01); *B62D 5/0481* (2013.01); *H02K 5/225* (2013.01); *H02K 11/33* (2016.01)

(58) Field of Classification Search
CPC .... B62D 5/0403; B62D 5/046; B62D 5/0481; B62D 5/0406; H01R 27/02; H01R 13/629; H02K 5/225; H02K 11/33; H02K 5/22
USPC .......................................................... 310/71
See application file for complete search history.

(56) References Cited

U.S. PATENT DOCUMENTS

| | | | |
|---|---|---|---|
| 6,577,030 B2 * | 6/2003 | Tominaga | H02K 11/33 |
| | | | 310/68 B |
| 2017/0158223 A1 | 6/2017 | Abe et al. | |
| 2017/0217481 A1 | 8/2017 | Asao et al. | |
| 2017/0294860 A1 | 10/2017 | Yamasaki | |
| 2017/0305457 A1 * | 10/2017 | Koike | H02K 11/0094 |
| 2018/0233992 A1 * | 8/2018 | Takeuchi | B62D 5/0406 |
| 2019/0016371 A1 | 1/2019 | Urimoto et al. | |
| 2019/0140574 A1 | 5/2019 | Yamasaki | |

(Continued)

OTHER PUBLICATIONS

U.S. Appl. No. 17/034,318 and its entire file history, filed Sep. 28, 2020, Yamasaki et al.

*Primary Examiner* — Ahmed Elnakib
(74) *Attorney, Agent, or Firm* — MASCHOFF BRENNAN

(57) ABSTRACT

A connector portion includes a first system connector that holds a first power supply terminal and a first signal terminal and a second signal terminal that holds a second power supply terminal and a second system connector. An insertion/removal direction of the first system connector is the same as the insertion/removal direction of the second system connector. The first system connector and the second system connector are arranged close to each other such that the interval between the connectors is smaller than the width in a short length direction of both connectors. The first power supply terminal is arranged closer to the second system connector than the first signal terminals in a frontage of the first system connector. The second power supply terminal is arranged closer to the first system connector than the second signal terminal in a frontage of the second system connector.

6 Claims, 23 Drawing Sheets

(56) References Cited

U.S. PATENT DOCUMENTS

| | | | |
|---|---|---|---|
| 2019/0310150 A1* | 10/2019 | Horiba | H02K 3/28 |
| 2019/0312491 A1* | 10/2019 | Yamamoto | H02K 5/225 |
| 2020/0140004 A1* | 5/2020 | Matsuda | H02K 11/215 |
| 2021/0075301 A1* | 3/2021 | Ichikawa | H02K 11/33 |
| 2021/0111659 A1* | 4/2021 | Akutsu | B62D 5/0403 |

* cited by examiner

US 11,801,887 B2

DRIVE DEVICE

CROSS REFERENCE TO RELATED APPLICATIONS

This application is a continuation application of International Patent Application No. PCT/JP2019/015271 filed on Apr. 8, 2019, which designated the U.S. and based on and claims the benefits of priority of Japanese Patent Application No. 2018-075412 filed on Apr. 10, 2018. The entire disclosure of all of the above applications is incorporated herein by reference.

TECHNICAL FIELD

The present disclosure relates to a drive device.

BACKGROUND

In a drive device, a motor and a control unit for controlling the motor are integrally provided.

SUMMARY

An object of the present disclosure is to provide a drive device in which noise increase is suppressed.

The drive device of the present disclosure includes a motor having winding sets in two systems, a control portion arranged coaxially with the motor and being configured to control a drive of the motor, and a connector portion for connecting to an external connector which is a connector of an external cable. The control portion includes a first system control portion configured to control energization of one winding set and a second system control portion configured to control energization of the other winding set.

The connector portion includes a first power supply terminal configured to supply power to the first system control portion, a first signal terminal configured to input a signal to the first system control portion, a first system connector configures to hold the first power supply terminal and the first signal terminal, a second power supply terminal configured to supply power to the second system control portion, a second signal terminal configured to input a signal to the second system control portion, and a second system connector configured to hold the second power supply terminal and the second signal terminal.

An insertion/removal direction of the first system connector is the same as the insertion/removal direction of the second system connector. The first system connector and the second system connector are arranged close to each other such that an interval between the connectors is smaller than a width in a short length direction of both connectors. The first power supply terminal is arranged closer to the second system connector with respect to the first signal terminal in a frontage of the first system connector. The second power supply terminal is arranged closer to the first system connector with respect to the second signal terminal in the frontage of the second system connector.

BRIEF DESCRIPTION OF DRAWINGS

The above and other objects, features and advantages of the present disclosure will become more apparent from the following detailed description made with reference to the accompanying drawings. In the drawings.

DETAILED DESCRIPTION

Figure 1:
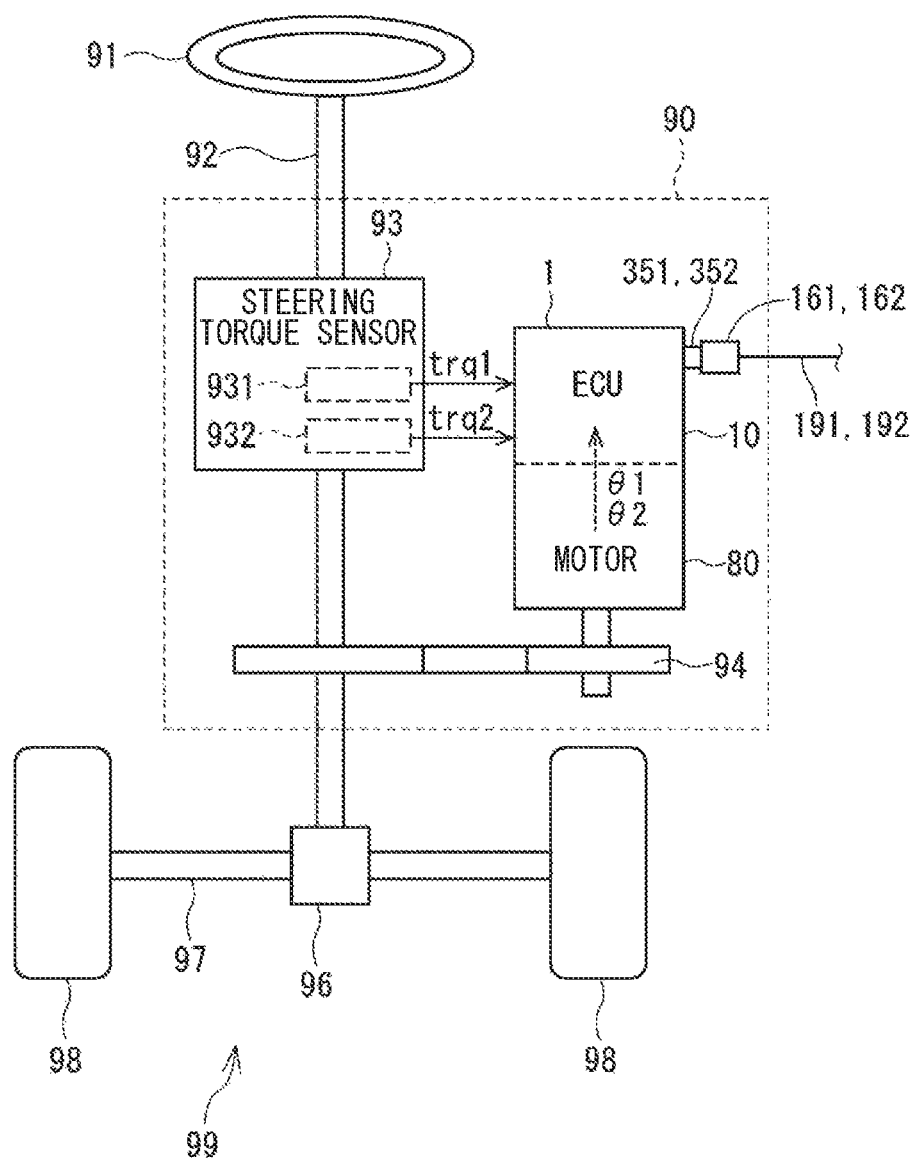
FIG. 1 is a configuration view of an electric power steering device to which the drive device of each embodiment is applied.

Hereinafter, a plurality of embodiments of a drive device will be described with reference to the drawings. In the embodiments, components which are substantially similar to each other are denoted by the same reference numerals and redundant description thereof is omitted. The drive device is applied to an electric power steering device of a vehicle and outputs steering assist torque.

First, a configuration of the electric power steering device, which is a matter common to each embodiment, will be described with reference to FIGS. 1 to 3. FIG. 1 shows an overall configuration of a steering system 99 including an electric power steering device 90. Although the electric power steering device 90 in FIG. 1 is a column assist type, it may be a rack assist type.

The steering system 99 includes a steering wheel 91, a steering shaft 92, a pinion gear 96, a rack shaft 97, road wheels 98, the electric power steering device 90 and the like. The steering shaft 92 is connected to the steering wheel 91. The pinion gear 96 provided at an end of the steering shaft 92 engages with the rack shaft 97. A pair of wheels 98 are provided at both ends of the rack shaft 97 via, for example, tie rods. When the driver rotates the steering wheel 91, the steering shaft 92 rotates. A rotational movement of the steering shaft 92 is converted into a linear movement of the rack shaft 97 by the pinion gear 96. The pair of wheels 98 is steered to an angle corresponding to the displacement amount of the rack shaft 97.

The electric power steering device 90 includes a steering torque sensor 93, a control unit 10, a motor 80, a speed reducer 94, and the like. The steering torque sensor 93 is provided at an intermediate portion of the steering shaft 92 to detect a steering torque applied by the driver. In the embodiment shown in FIG. 1, the steering torque sensor 93 is a dual type, which includes a first torque sensing element 931 and a second torque sensing element 932, and detects a first steering torque trq1 and a second steering torque trq2, respectively, in a dual manner. In case that the steering torque sensing elements are not provided in redundancy, a detected value of one steering torque trq may be used in common for two systems.

The control unit 10 acquires the steering torques trq1 and trq2 detected by the steering torque sensor 93 and the electrical angles θ1 and θ2 of the motor 80 detected by the rotation angle sensor. The control unit 10 controls the drive of the motor 80 so that the motor 80 generates a desired assist torque based on these information (the steering torque and the electrical angle) and information such as the motor current detected inside the control unit 10. The assist torque generated by the motor 80 is transmitted to the steering shaft 92 via the speed reducer 94.

The control unit 10 is integrally formed on one side of the motor 80 in the axial direction. The motor 23 and the control unit 10 configure a drive device 1 of an electromechanical integrated type. In the configuration shown in FIG. 1, the control unit 10 is arranged coaxially with the motor 80 on the side opposite to an output side of the motor 80. In another embodiment, the control unit 10 may be arranged coaxially with the motor 80 on the output side of the motor 80.

Figure 2:
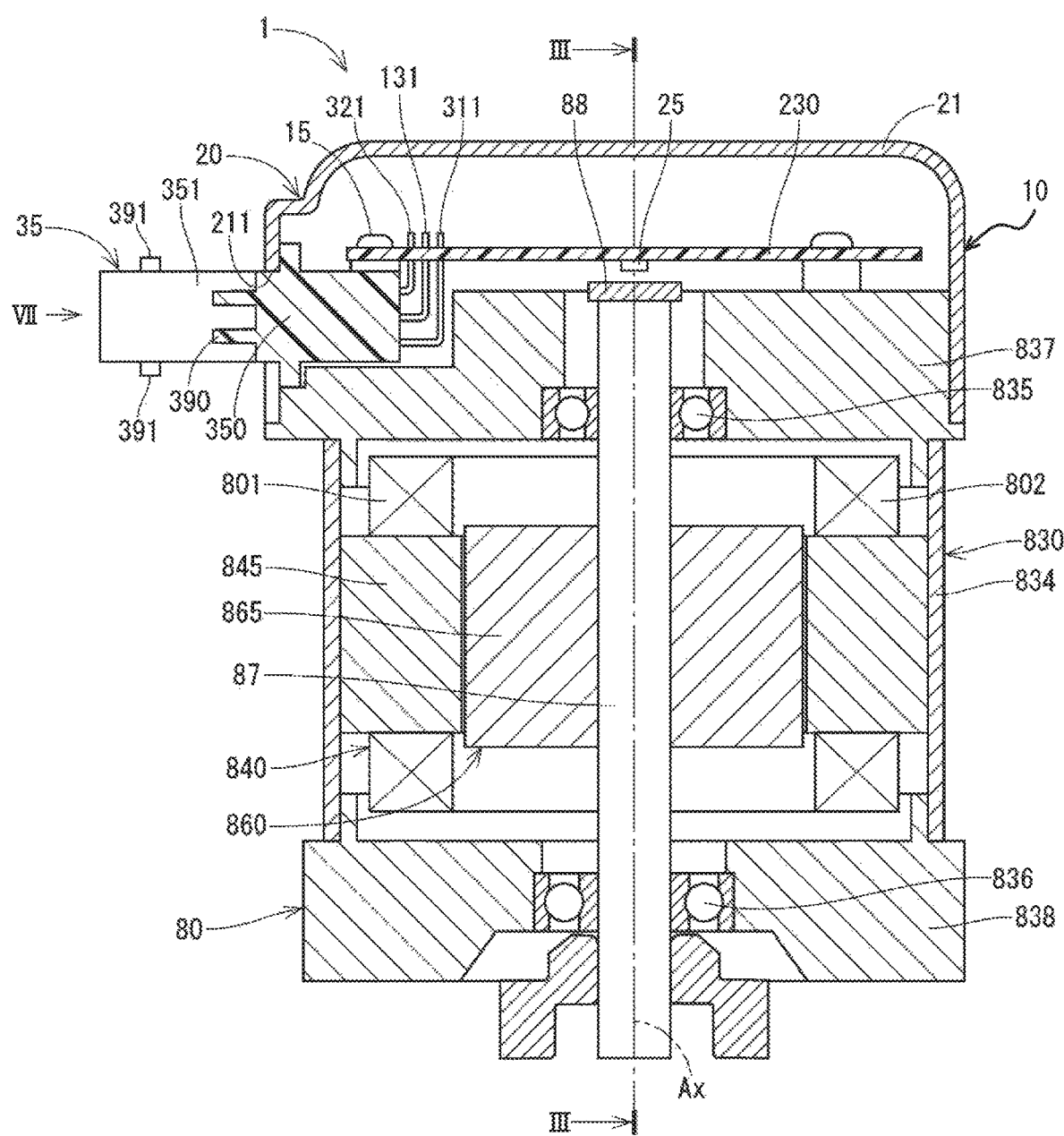
FIG. 2 is a vertical cross-sectional view of the drive device.
Figure 3:
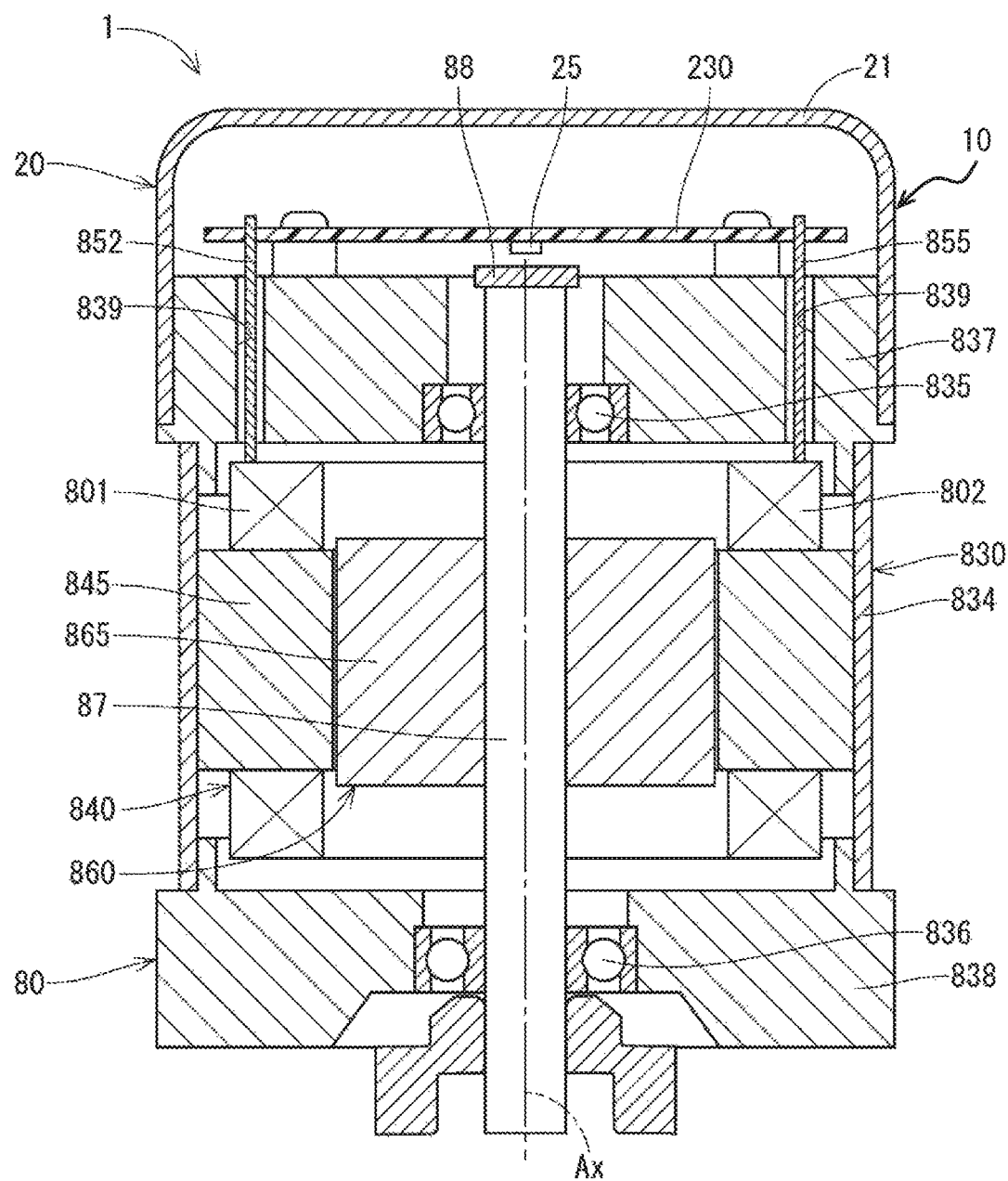
FIG. 3 is a cross sectional view taken along the line III-Ill of FIG. 2.

As shown in FIGS. 2 and 3, the motor 80 is a three-phase brushless motor and includes a stator 840, a rotor 860, and a housing 830 that houses them. The stator 840 has a stator core 845 fixed to the housing 830 and first and second three-phase winding sets 801, 802 assembled to the stator core 845. Lead wires 852 extend from each phase winding forming the first winding set 801. Lead wires 855 extend from each phase winding forming the second winding set 802.

The rotor 860 has a shaft 87, which is supported by a rear bearing 835 and a front bearing 836, and a rotor core 865, into which the shaft 87 is firmly fitted. The rotor 860 is provided radially inside the stator 840 to be rotatable relative to the stator 840. A permanent magnet 88 is provided at one axial end of the shaft 87.

The housing 830 has a cylindrical case 834, a rear frame end 837 provided at one end of the case 834, and a front frame end 838 provided at the other end of the case 834. The rear frame end 837 and the front frame end 838 are fastened to each other by bolts or the like. The lead wires 852, 855 of each winding set 801, 802 are connected to the control unit 10 through the lead wire insertion holes 839 of the rear frame end 837.

Figure 4:
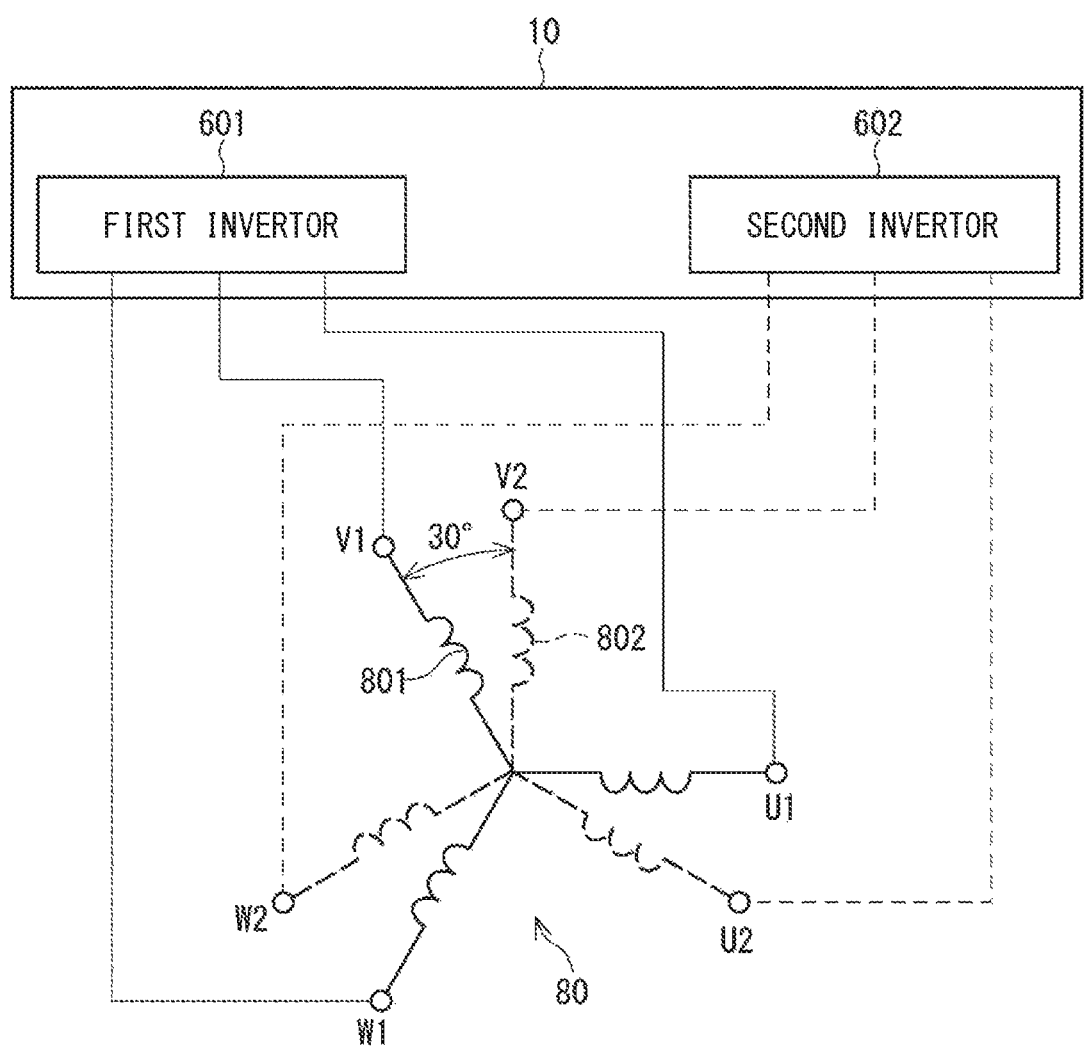
FIG. 4 is a schematic view showing a configuration of a multi-phase coaxial motor.

As shown in FIG. 4, the winding sets 801 and 802 have the same electrical characteristics and are wound on a common stator while being shifted from each other by an electrical angle of 30 degrees.

First Embodiment

Next, the configuration of the drive device 1 of the first embodiment will be described with reference to FIGS. 2 to 13. As shown in FIGS. 2 and 3, the control unit 10 includes a control portion 20, a cover 21 that covers the control portion 20, a connector portion 35 for connecting the control portion 20 to external connectors 161 and 162 (see FIG. 1) which are connectors of external cables 191, 192 and the like. The cover 21 protects the control portion 20 from an external impact and prevents dust, water, and the like from entering the control portion 20.

The control portion 20 includes a circuit board 230 fixed to the rear frame end 837 and various electronic components mounted on the circuit board 230. In FIGS. 2 and 3, electronic components are not shown. The electronic components will be described later with reference to FIGS. 5 and 6. The circuit board 230 is, for example, a printed board, and is provided at a position facing the rear frame end 837. On the circuit board 230, the electronic components of first and second systems are mounted independently for each system so that the two systems are provided in a fully redundant configuration. In the first embodiment, the circuit board 230 is provided singly but, as another embodiment, two or more circuit boards may be provided.

Figure 5:
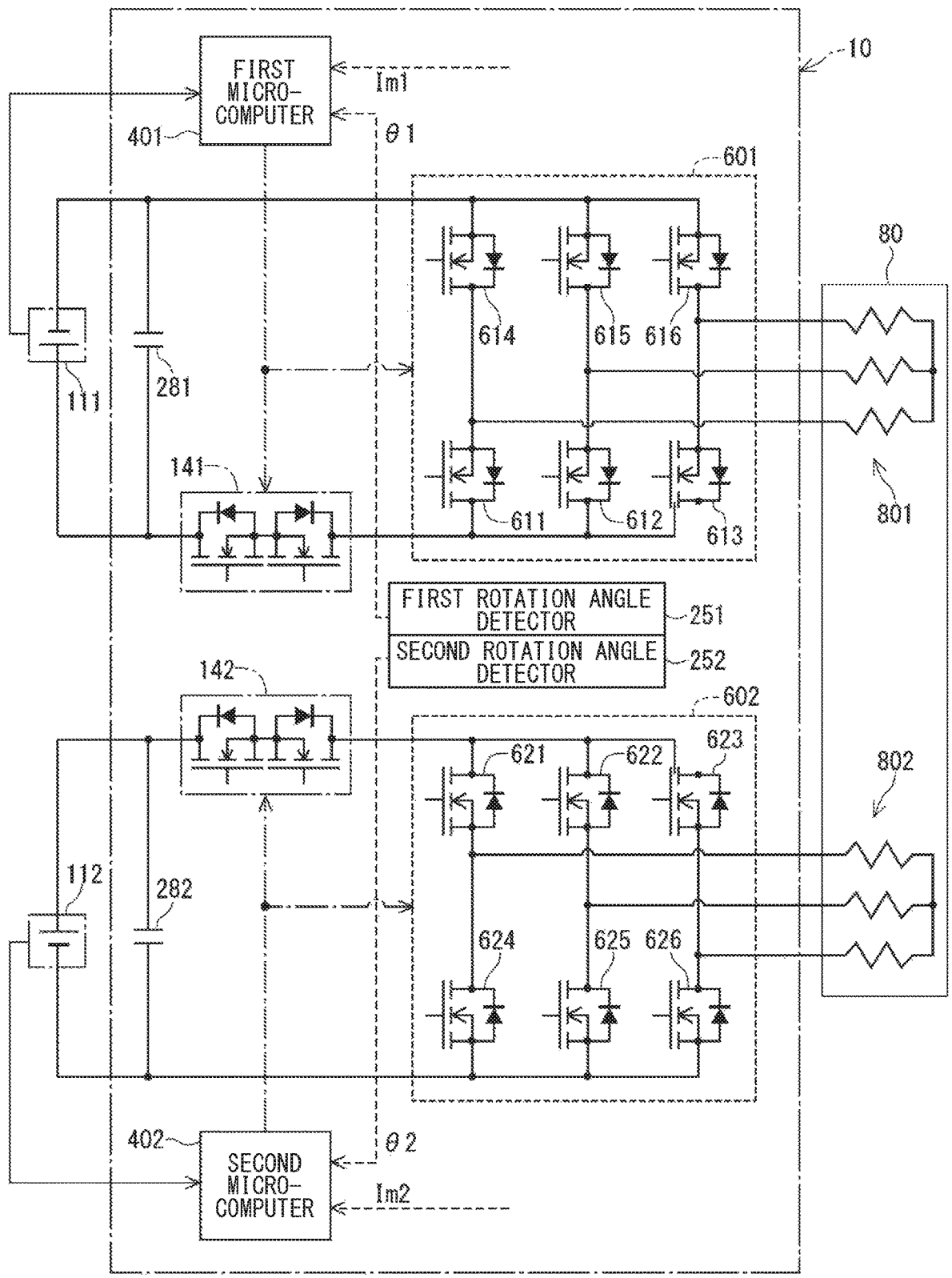
FIG. 5 is a circuit configuration view of the drive device according to a first embodiment.

FIG. 5 shows a circuit configuration of the drive device 1. The control portion 20 is a two-system motor control device including two inverters 601, 602 as power converters and two microcomputers 401, 402. The control portion 20 is configured to control power supply to the motor 80 including two winding sets 801, 802. Here, a unit of the components including the winding set, the inverter and the microcomputer is defined as a "system".

In the present disclosure, the components or signals of the first system are distinguished by adding "first" or "first system" to the beginning of the word, and the components or signals of the second system are distinguished by adding "second" or "second system" to the beginning of the word. However, when not necessary, "first, second" and "first system, second system" are not attached to the common features in each system. Also, except for the switching elements, the reference numerals of the components or signals of the first system are appended with numeral "first", and the components of the second system or signals are appended with numeral "second".

The control portion 20 includes inverters 601, 602, power supply relays 141, 142, rotation angle detectors 251, 252, and microcomputers 401, 402. In the first embodiment, electric power is supplied from the two power supply 111 and 112 to each system.

Each of the inverters 601 and 602 has six switching elements 611 to 616 and 621 to 626, such as MOSFETs, for example, which are bridge-connected. In the first system, the first inverter 601 performs a switching operation by a drive signal applied from the first microcomputer 401, converts DC power of the first power supply 111, and supplies the DC power to the first winding set 801. In the second system, the second inverter 602 performs a switching operation according to a drive signal applied from the second microcomputer 402, converts DC power of the second power supply 112, and supplies the DC power to the second winding set 802.

The power supply relays 141 and 142 are provided on the power supply lines of the input sides of the inverters 601 and 602, respectively. The power relays 141 and 142 illustrated in FIG. 5 include a protection function at the time of reverse connection of a power supply, in which two switching elements having parasitic diodes opposite to each other are connected in series. However, the power relay may be configured by one switching element or a mechanical relay that does not include a reverse connection prevention function. In addition, smoothing capacitors 281 and 282 are provided at the input sides of the inverters 601 and 602, respectively. The capacitors 281 and 282 smoothen an input power supplied from power supply batteries and prevent noise generated and flowing out due to the switching operation or the like of the switching elements, respectively. The capacitors 281 and 282 form a filter circuit together with an inductor (not shown).

The first rotation angle detector 251 detects an electrical angle 81 of the motor 80 and outputs it to the first microcomputer 401. The second rotation angle detector 252 detects an electrical angle 82 of the motor 80 and outputs it to the second microcomputer 402. The first rotation angle detector 251 has a power supply line and a signal line that are independent of the second rotation angle detector 252.

The first microcomputer 401 calculates a drive signal for instructing the first inverter 601 based on the feedback information such as the steering torque trq1, the current Im1, and the rotation angle 81. The second microcomputer 402 calculates a drive signal to instruct the second inverter 602 based on feedback information such as the steering torque trq2, the current Im2, and the rotation angle 82.

Figure 6:
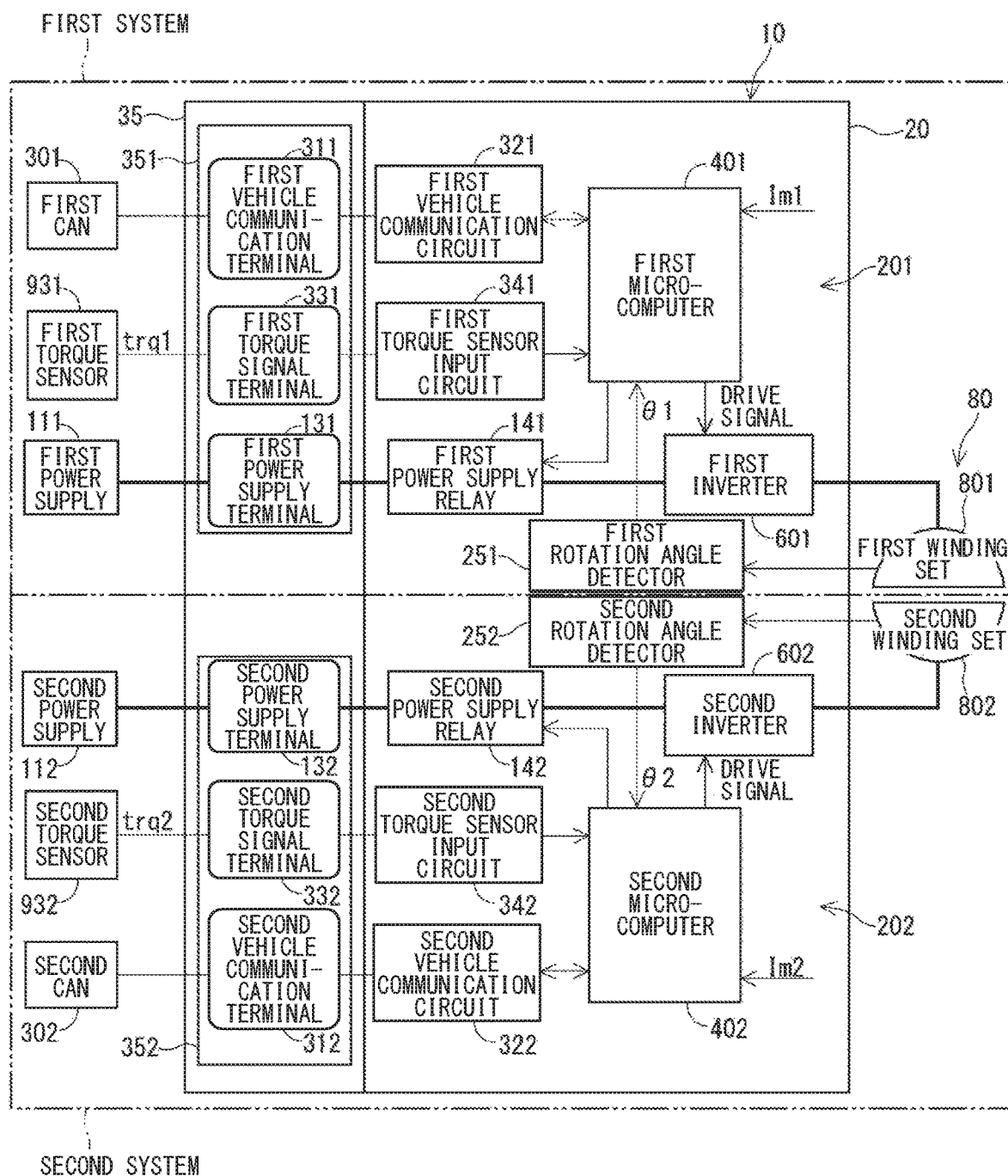
FIG. 6 is a control block diagram of the drive device according to the first embodiment.

FIG. 6 shows a control configuration of the drive device 1. In FIG. 6, the first system and the second system, which are referred to as GR1 and GR2, respectively, are formed of two independent sets of element groups in a fully duplicated system. In the control portion 20, each electronic component of the first system that controls the energization of the winding set 801 constitutes a first system control portion 201. In addition, in the control portion 20, each electronic component of the second system that controls the energization of the winding set 802 constitutes a second system control portion 202.

The connector portion 35 includes a first system terminal group connected to the first system control portion 201, the first system connector 351 that holds the first system terminal group, a second system terminal group connected to the second system control portion 202, and a second system connector 352 that holds the second system terminal group.

The first system terminal group includes a first power supply terminal 131 for supplying power to the first system control portion 201, a first vehicle communication terminal 311 and a first torque signal terminal 331 that input a signal to the first system control portion 201. The second system terminal group includes a second power supply terminal 132 for supplying power to the second system control portion 202, a second vehicle communication terminal 312 and a second torque signal terminal 332 that input a signal to the second system control portion 202.

The first power supply terminal 131 is connected to a first power supply 111. The power of the first power supply 111 is supplied to the first winding set 801 via the first power supply terminal 131, the first power supply relay 141, and the first inverter 601. Further, the power of the first power supply 111 is also supplied to the first microcomputer 401 and the sensors of the first system.

The second power supply terminal 132 is connected to the second power supply 112. The power of the second power supply 112 is supplied to the second winding set 802 via the second power supply terminal 132, the second power supply relay 142, and the second inverter 602. The power of the second power supply 112 is also supplied to the second microcomputer 402 and the sensors of the second system.

When CAN is redundantly provided as a vehicle communication network, the first vehicle communication terminal 311 is connected between the first CAN 301 and the first vehicle communication circuit 321. The second vehicle communication terminal 312 is connected between the second CAN 302 and the second vehicle communication circuit 322. When the CAN is not redundantly provided, the vehicle communication terminals 311 and 312 of the two systems may be connected to the common CAN. Further, as a vehicle communication network other than CAN, any standard network such as CAN-FD (CAN with Flexible Data rate) or FlexRay may be used.

The first torque signal terminal 331 is connected between the first torque sensor 931 and the first torque sensor input circuit 341. The first torque sensor input circuit 341 notifies the first microcomputer 401 of the steering torque trq1 detected by the first torque signal terminal 331. The second torque signal terminal 332 is connected between the second torque sensor 932 and the second torque sensor input circuit 342. The second torque sensor input circuit 342 notifies the second microcomputer 402 of the steering torque trq2 detected by the second torque signal terminal 332.

The microcomputers 401 and 402 can exchange information with each other by communication between the microcomputers. When an abnormality has occurred in one system, the control portion 20 continues the motor control with the other normal system.

FIGS. 2, 7, 8 and 9 show the structure of the connector portion 35. Hereinafter, a direction orthogonal to the axis Ax of the motor 80 will be referred to as a "radial direction". The connector portion 35 includes a base part 350, connectors 351, 352, power supply terminals 131, 132, a first vehicle communication terminal 311 and a first torque signal terminal 331 as a "first signal terminal", and a second vehicle communication terminal 322 and the second torque signal terminal 332 as a "second signal terminal". The base part 350 is fixed to the circuit board 230 by the screw 15. A part of the base part 350 is exposed to the outside of the cover 21 through the opening 211 of the cover 21. The connectors 351 and 352 project from the base part 350 in the radial direction.

The first system connector 351 holds the first power supply terminal 131, the first vehicle communication terminal 311, and the first torque signal terminal 331. The second system connector 352 holds the second power supply terminal 132, the second vehicle communication terminal 312, and the second torque signal terminal 332. An insertion/removal direction of the first system connector 351 is the same as the insertion/removal direction of the second system connector 352, and is the radial direction. The insertion/removal direction is the direction in which an external connector is inserted/removed in/from the connectors 351 and 352, and coincides with a direction of a frontage of the connectors 351 and 352. The frontage is an opening at a tip of the connectors 351 and 352.

Figure 7:
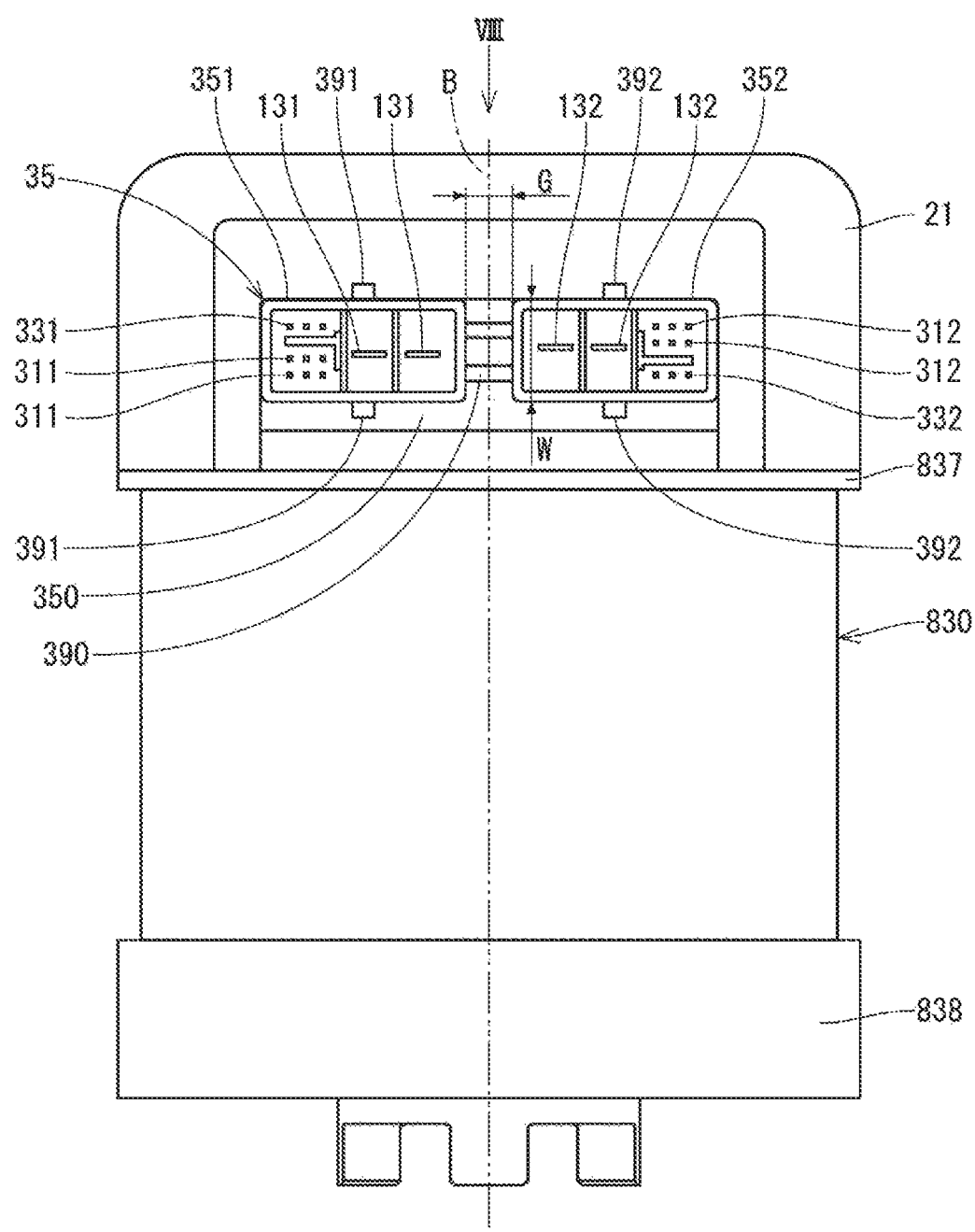
FIG. 7 is a front view of the drive device according to the first embodiment and is a view as seen from arrow VII of FIG. 2.

As shown in FIG. 7, the first system connector 351 and the second system connector 352 are arranged close to each other such that an interval G between the connectors 351, 352 is smaller than a width W in a short length direction of both connectors 351, 352. In the first embodiment, the first system connector 351 and the second system connector 352 are arranged such that the long length directions of the frontages of these connectors 351, 352 are aligned. A rib 390 for connecting the first system connector 351 and the second system connector 352 is formed between the connectors 351, 352.

The first power supply terminal 131 is arranged closer to the second system connector 352 with respect to the first signal terminal in the frontage of the first system connector 351. In the first embodiment, the first power supply terminal 131 is arranged on the second system connector 352 side in the long length direction of the frontage in the frontage of the first system connector 351. The first signal terminal is arranged on the side opposite to the second system connector 352 in the long length direction of the frontage in the frontage of the first system connector 351.

The second power supply terminal 132 is arranged closer to the first system connector 351 with respect to the second signal terminal in the frontage of the second system connector 352. In the first embodiment, the second power supply terminal 132 is arranged on the first system connector 351 side in the long length direction of the frontage in the frontage of the second system connector 352. The second signal terminal is arranged on the side opposite to the first system connector 351 in the long length direction of the frontage in the frontage of the second system connector 352.

In the first embodiment, with a boundary surface B located between the connectors 351, 352 as a boundary, the first system terminal (the first power supply terminal 131, the first vehicle communication terminal 311, and the first torque signal terminal 331) and the second system terminal (the second power supply terminal 132, the second vehicle communication terminal 312, and the second torque signal terminal 332) are arranged in a mirror so that the power supply terminals 131 and 132 are located in a center. The first power supply terminal 131 and the second power supply terminal 132 are arranged close to a center of a connector arrangement space, and the signal terminals are arranged at both ends of the connector arrangement space.

Figure 9:
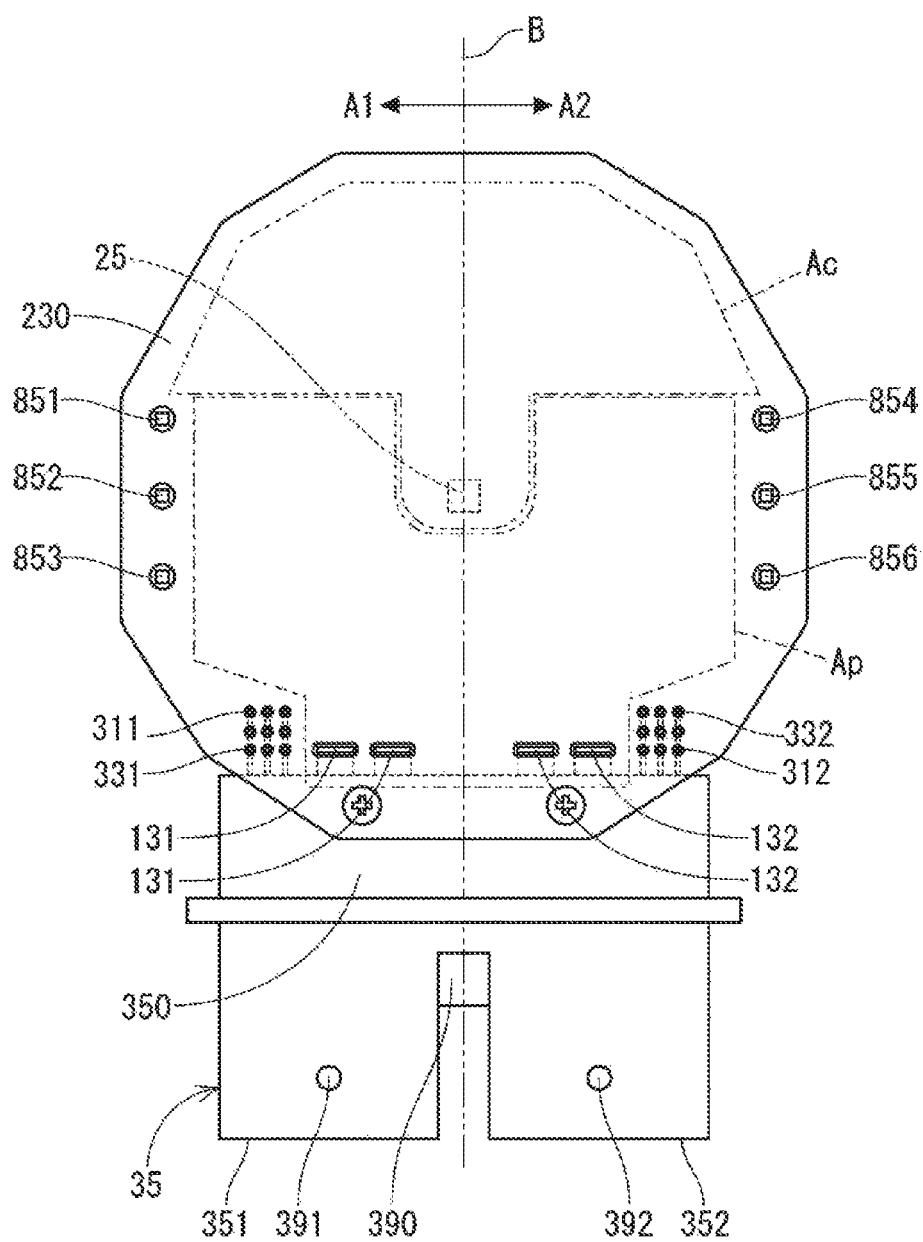
FIG. 9 is a view showing a circuit board and a connector portion according to the first embodiment.
Figure 10:
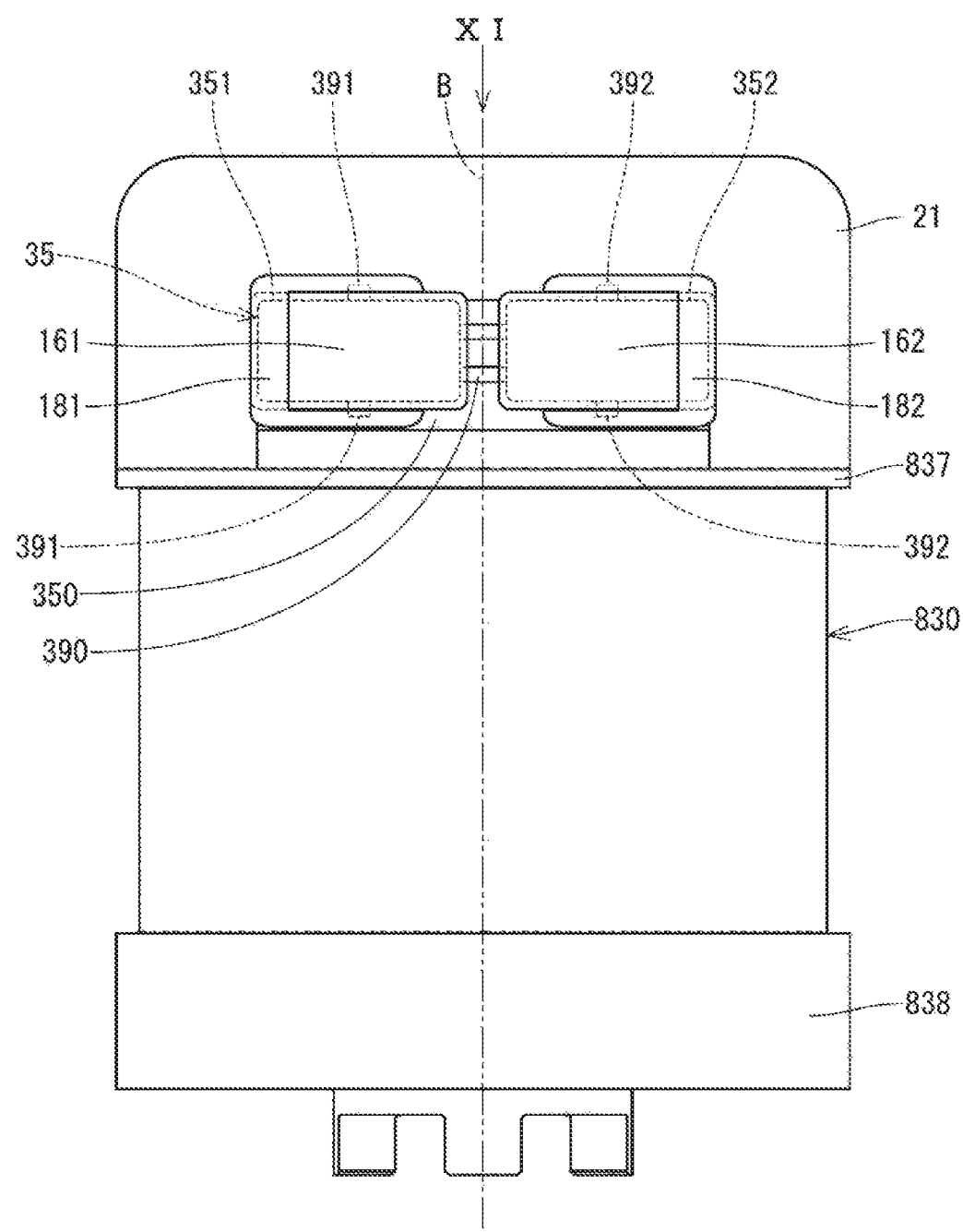
FIG. 10 is a view showing a front surface of the drive device and a view showing an external connector in an unlocked state according to the first embodiment.

The first rotation angle detector 251 and the second rotation angle detector 252 shown in FIG. 6 are packaged together to form the rotation angle sensor 25 shown in FIG. 9. The first system control portion 201 and the second system control portion 202 are mounted on one circuit board 230. As shown in FIG. 9, a mounting area A1 of the first system control portion 201 is arranged on one side of the circuit board 230 with the boundary surface B as a boundary that passes through the rotation angle sensor 25 and is parallel to the axis Ax. A mounting area A2 of the second system control portion 202 is arranged on the other side of the circuit board 230 with the boundary surface B as the boundary. The first system control portion 201 and the second system control portion 202 are separated by the boundary surface B.

The first power supply relay 141, the first capacitor 281, and the first inverter 601 are first power system components of the first system control portion 201. The second power supply relay 142, the second capacitor 282, and the second inverter 602 are second power system components of the second system control portion 202. On the other hand, the first vehicle communication circuit 321, the first torque sensor input circuit 341, the first microcomputer 401, and the first rotation angle detector 251 are first control system components of the first system control portion 201. The second vehicle communication circuit 322, the second torque sensor input circuit 342, the second microcomputer 402, and the second rotation angle detector 252 are second control system components of the second system control portion 202. As shown in FIG. 9, a mounting area Ap for the power system components is located closer to the connectors 351 and 352 than the mounting area Ac for the control system components. That is, the power system components are arranged closer to the connectors 351 and 352 on the circuit board 230 than the control system components.

As shown in FIG. 7, the first system connector 351 is arranged on one side with respect to the boundary surface B, and the second system connector 352 is arranged on the other side with respect to the boundary surface B. Then, on one side with respect to the boundary surface B, the first power supply terminal 131 and the first signal terminal are arranged in order from the boundary surface B. Further, on the other side with respect to the boundary surface B, the second power supply terminal 132 and the second signal terminal are arranged in order from the boundary surface B.

Figure 8:
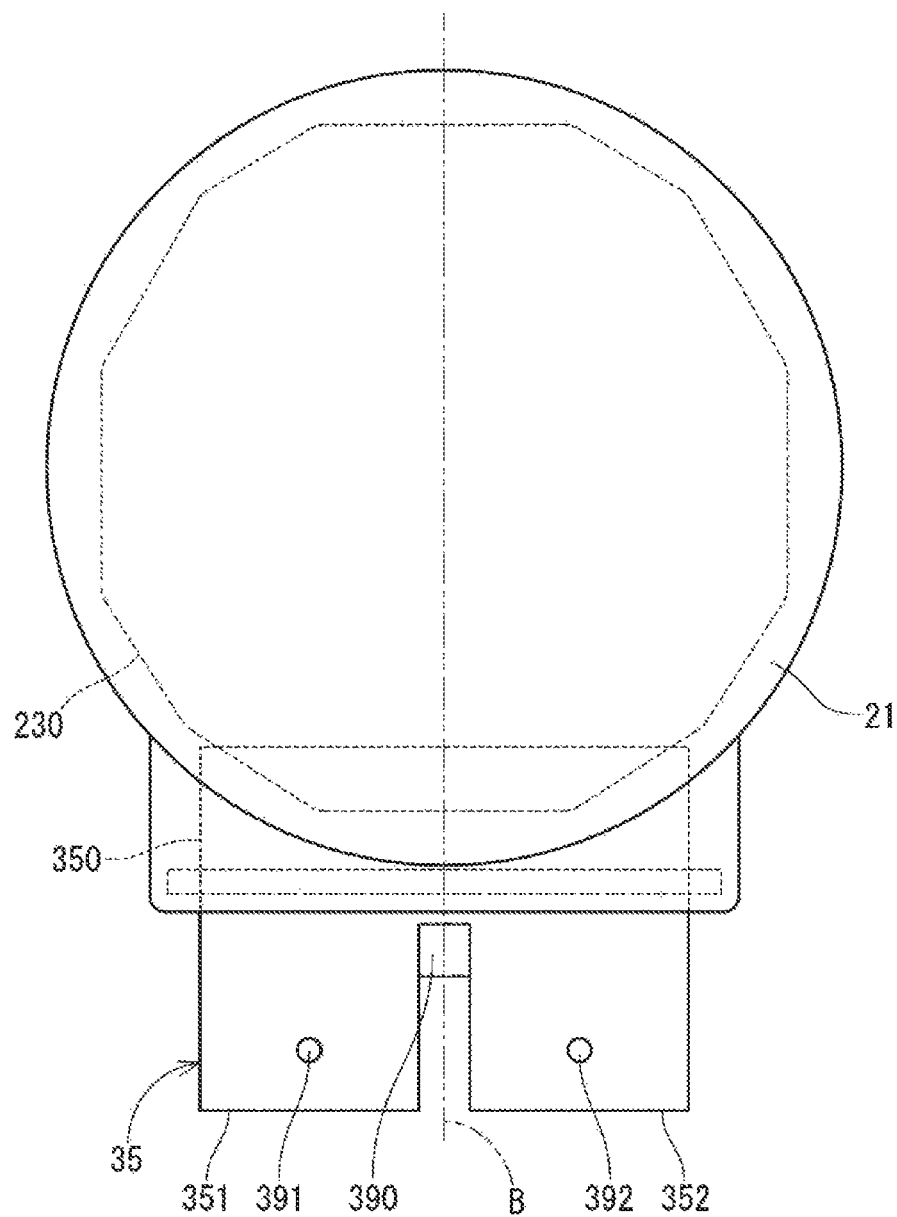
FIG. 8 is a top view of the drive device according to the first embodiment and is a view as seen from arrow VIII of FIG. 7.

As shown in FIGS. 2, 7, and 8, the connectors 351 and 352 have protrusions 391 and 392 that project in a direction orthogonal to the direction in which the connectors 351 and 352 are arranged. That is, the protrusions 391 and 392 do not protrude in the direction in which the connectors 351 and 352 are arranged, and are not formed in a gap between the connectors. In the first embodiment, the frontage of the connectors 351 and 352 is rectangular. The connectors 351 and 352 are composed of a pair of long side parts and a pair of short side parts. The protrusions 391 and 392 are formed on the long side parts and are not formed on the short side parts. The gap G is set to 4 times or less a height of the protrusions 391 and 392.

As shown in FIGS. 10 to 13, the external connectors 161 and 162 are fitted in the frontages of the connectors 351 and 352. The external connectors 161 and 162 are provided with levers 181 and 182 that rotate about positions corresponding to the protrusions 391 and 392. The external connectors 161 and 162 have cutout grooves 175 and 176 for avoiding interference with the protrusions 391 and 392 when the external connectors 161, 162 are inserted into the connectors 351 and 352. The levers 181 and 182 are also provided with engagement grooves 185 and 186 for avoiding interference during insertion into the connectors 351 and 352. When the drive device is mounted on the vehicle, a worker pushes the levers 181 and 182 to insert the external connectors 161 and 162 into the connectors 351 and 352, and fit them into the frontages of the connectors 351, 352. That is, as the levers 181 and 182 rotate from the state shown in FIG. 10 to the state shown in FIG. 12, the external connectors 161 and 162 move in the insertion direction. Then, when the levers 181 and 182 are rotated to the state of FIG. 12, the engagement grooves 185 and 186 are located in the direction orthogonal to the insertion/removal direction, and prevent the external connectors 161 and 162 from falling off. Here, in order to fix the levers 181 and 182 in the state of FIG. 12, the external connectors 161 and 162 may be provided with a claw portion, and the levers 181 and 182 may be provided with a hole portion so as to be fitted with each other. Further, when the levers 181 and 182 rotate from the state of FIG. 10 to the state of FIG. 12, the engagement grooves 185 and 186 may engage with the protrusions 391 and 392 in the insertion/removal direction. The protrusions 391 and 392 lock the levers 181 and 182 of the external connectors 161 and 162, and may lock the levers 181 and 182.

Figure 11:
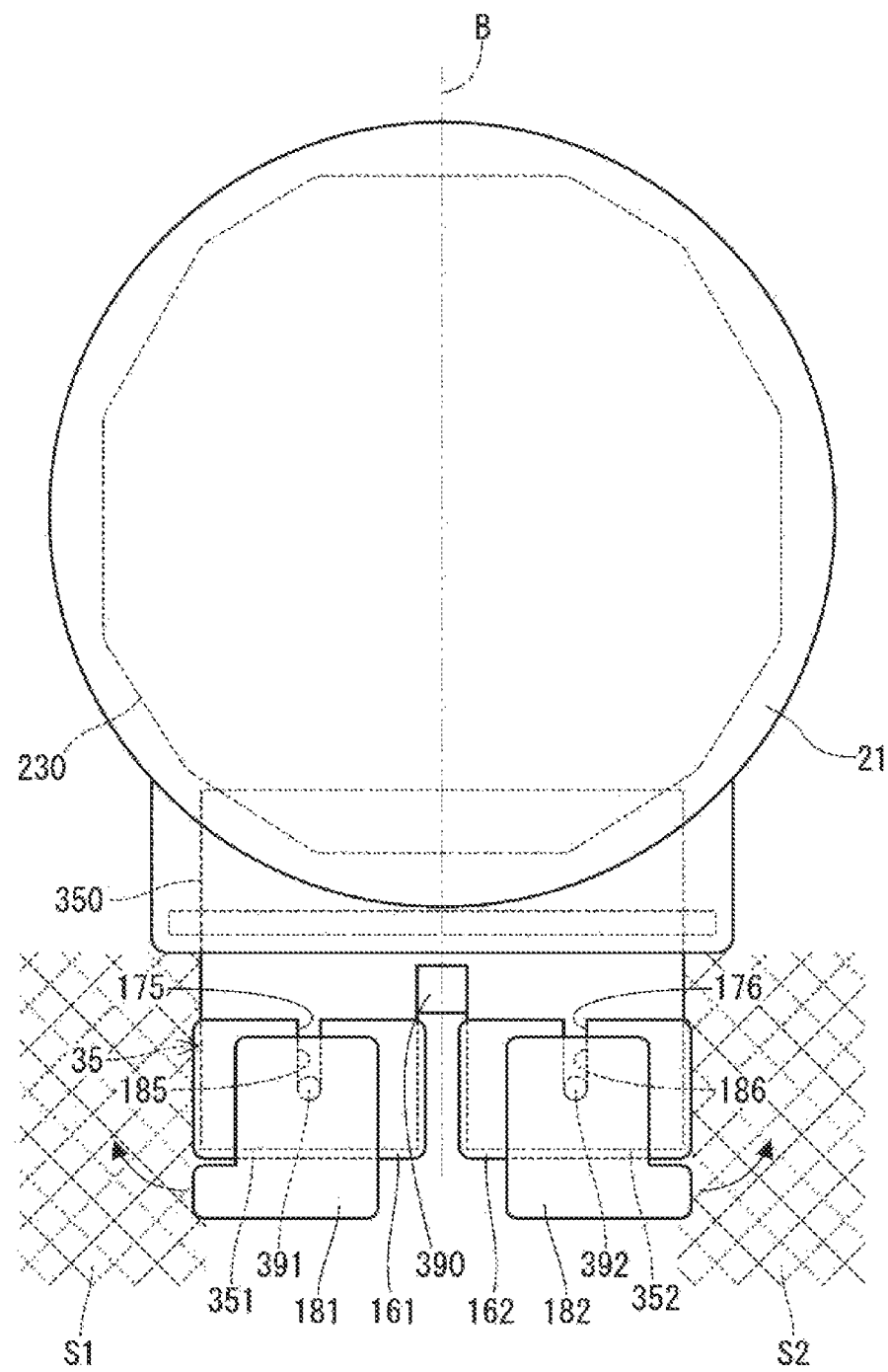
FIG. 11 is a view showing an upper surface of the drive device and the external connector in the unlocked state according to the first embodiment, and is a view as seen from arrow XI of FIG. 10.
Figure 12:
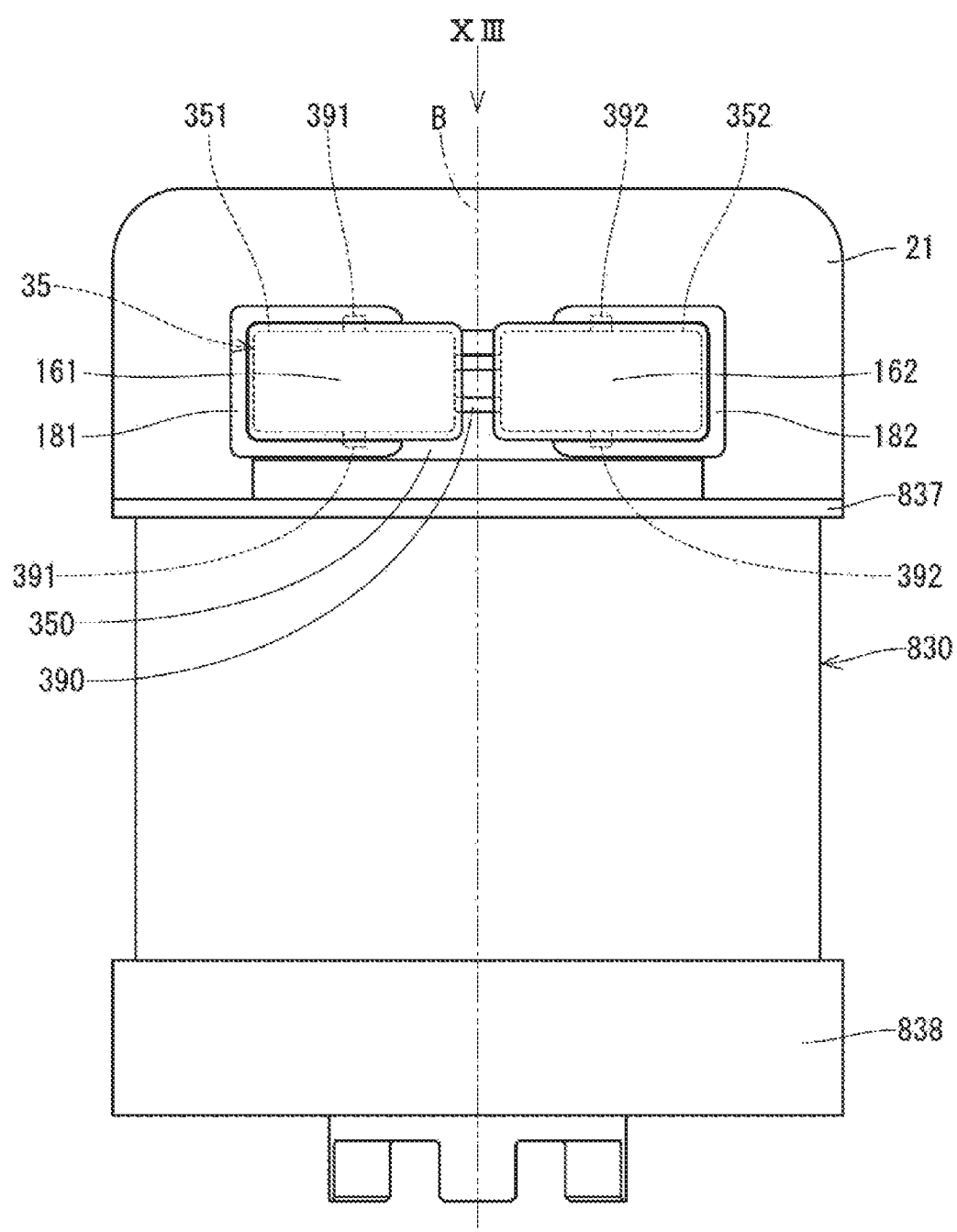
FIG. 12 is a view showing a front surface of the drive device and an external connector in a locked state according to the first embodiment.
Figure 13:
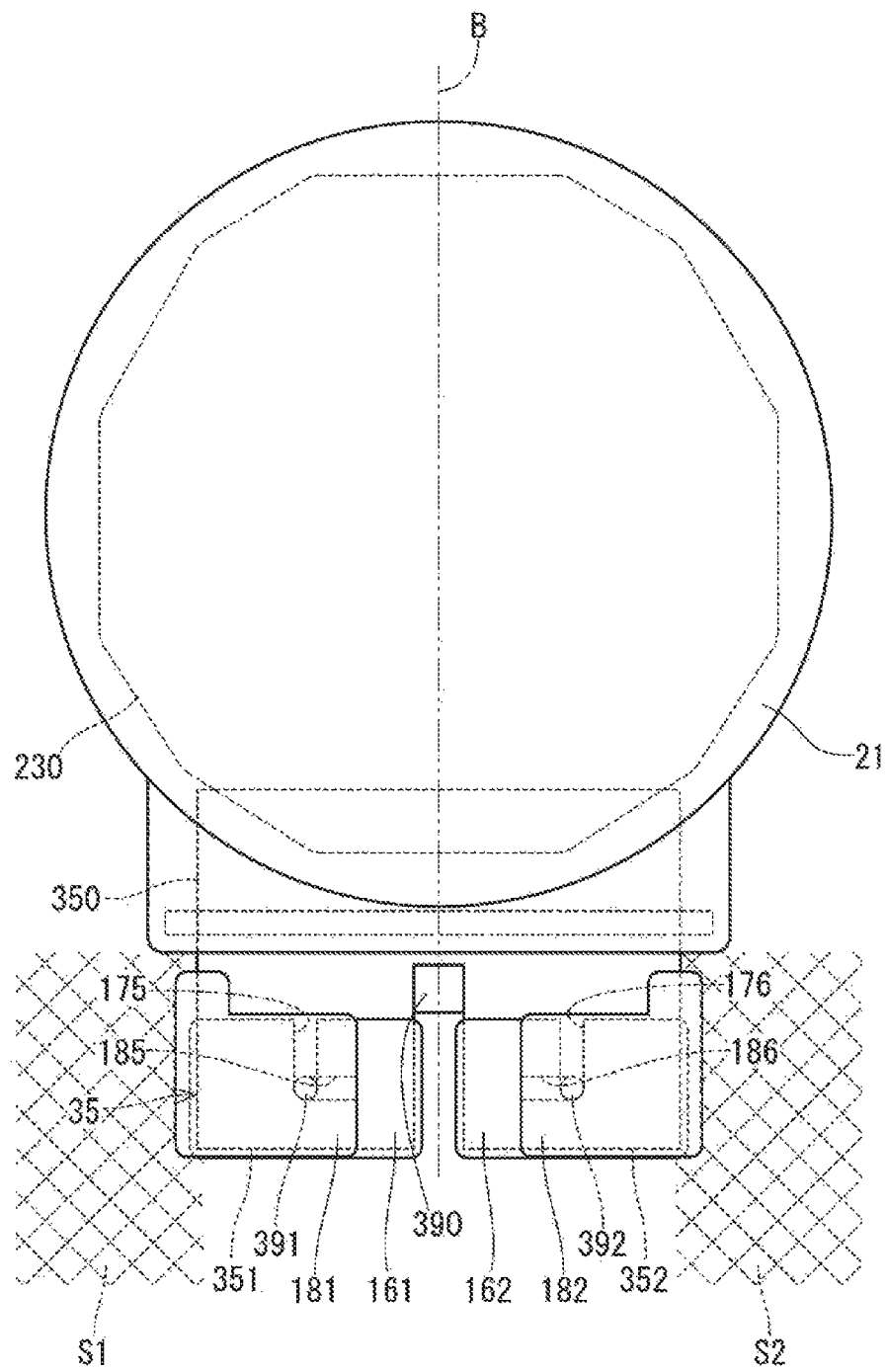
FIG. 13 is a diagram showing the upper surface of the drive device and the external connector in a locked state according to the first embodiment, and is a view as seen from arrow XIII of FIG. 12.

As shown in FIGS. 11 and 13, a space S1 is provided on an opposite side of the first system connector 351 from the second system connector 352 side. In this space S1, the first lever 181 to be engaged with the protrusion 391 of the first system connector 351 is switched between a locked state (see FIG. 13) and a unlocked state (see FIG. 11). A space S2 is provided on an opposite side of the second system connector 352 from the first system connector 351 side. In the space S2, the second lever 182 to be engaged with the protrusion 392 of the second system connector 352 is switched between the locked state and the unlocked state.

(Effects)

As described above, in the first embodiment, the insertion/removal directions of the first system connector 351 is the same as the insertion/removal direction of the second system connector 352. The first system connector 351 and the second system connector 352 are arranged close to each other such that the interval G between the connectors is smaller than the width W in a short length direction of both connectors. The first power supply terminal 131 is arranged closer to the second system connector 352 with respect to the first signal terminal in the frontage of the first system connector 351. The second power supply terminal 132 is arranged closer to the first system connector 351 with respect to the second signal terminal in the frontage of the second system connector 352.

Since the first power supply terminal 131 and the second power supply terminal 132 are arranged close to the center of the connector arrangement space in this way, it becomes easy to avoid the intersection of the power supply line and the signal line. Moreover, an increase in a loop area of the power supply line can be suppressed. Therefore, the influence of noise on the signal line can be reduced. There is a concern that noise may occur even if an abnormality occurs in one system and motor control is continued only by the other normal system. Even in such a case, the influence of noise can be reduced by arranging the power supply terminal close to the center of the connector arrangement space.

In the first embodiment, with a boundary surface B located between the connectors 351, 352 as a boundary, the first system terminal (the first power supply terminal 131, the first vehicle communication terminal 311, and the first torque signal terminal 331) and the second system terminal (the second power supply terminal 132, the second vehicle communication terminal 312, and the second torque signal terminal 332) are arranged in a mirror so that the power supply terminals 131 and 132 are located in a center. Accordingly, the first power supply terminal 131 and the second power supply terminal 132 can be arranged close to the center of the connector arrangement space.

In the first embodiment, the first system connector 351 and the second system connector 352 are arranged such that the long length directions of the frontages of these connectors 351, 352 are aligned. Accordingly, the first power supply terminal 131 and the second power supply terminal 132 is easily arranged close to the center of the connector arrangement space.

Further, in the first embodiment, the first system control portion 201 and the second system control portion 202 are mounted on one circuit board 230. The first system control portion 201 and the second system control portion 202 are separated by the boundary surface B. As a result, the first system terminal and the first system control portion 201 on the circuit board 230 are connected so that the power supply line and the signal line do not intersect, and the second system terminal and the second system control portion 202 on the circuit board 230 can be connected.

Further, in the first embodiment, the power system components of the control portions 201 and 202 are arranged closer to the connectors 351 and 352 on the circuit board 230 than the control system components of the control portions 201 and 202. As a result, the wiring path on the circuit board of the power supply line through which a relatively large current flows is shortened, the loop area of the power supply line is reduced, the noise effect on the signal line can be reduced, and heat generation (that is, current loss) is reduced.

Further, in the first embodiment, the first power supply terminal 131 and the first signal terminal are sequentially arranged on one side with respect to the boundary surface B from the boundary surface B. Further, on the other side with respect to the boundary surface B, the second power supply terminal 132 and the second signal terminal are arranged in order from the boundary surface B. As a result, the first system terminal and the first system control portion 201 on the circuit board 230 are connected so that the power supply line and the signal line do not intersect, and the second system terminal and the second system control portion 202 on the circuit board 230 can be connected.

In the first embodiment, the connectors 351 and 352 have protrusions 391 and 392 that project in a direction orthogonal to the direction in which the connectors 351 and 352 are arranged. That is, the protrusions 391 and 392 do not protrude in the direction in which the connectors 351 and 352 are arranged, and are not formed in a gap between the connectors. As a result, the protrusions 391 and 392 are separated from each other, so that the connectors 351 and 352 can be brought close to each other. Therefore, the space for connector installation is reduced, and the size of the drive device 1 can be reduced. In addition, since the protrusions 391 and 392 are separated from each other, a work space for connecting the external connectors 161 and 162 to the connectors 351 and 352 respectively, that is, a space for operating the levers 181 and 182 of the external connectors 161, 162, is sufficiently created, and assembly is improved.

Further, in the first embodiment, the space S1 is provided on the opposite side of the first system connector 351 from the second system connector 352 so that the first lever 181 is switched between the locked state and the unlocked state. A space S2 is provided on the opposite side of the second system connector 352 from the first system connector 351 side so that the lever 182 is switched between the locked state and the unlocked state. Therefore, a work area for attaching and detaching the external connectors 161 and 162 is secured, and workability is improved. In addition, it is possible to reduce the overall size of the external connectors 161 and 162 in a mounted state.

In the first embodiment, the rib 390 for connecting the first system connector 351 and the second system connector 352 is formed between the first system connector 351 and the second system connector 352. As a result, the strength and deformation of the connector portion 35 can be improved, and the back rib is not required, so that the connector portion 35 can be downsized.

Second Embodiment

Figure 14:
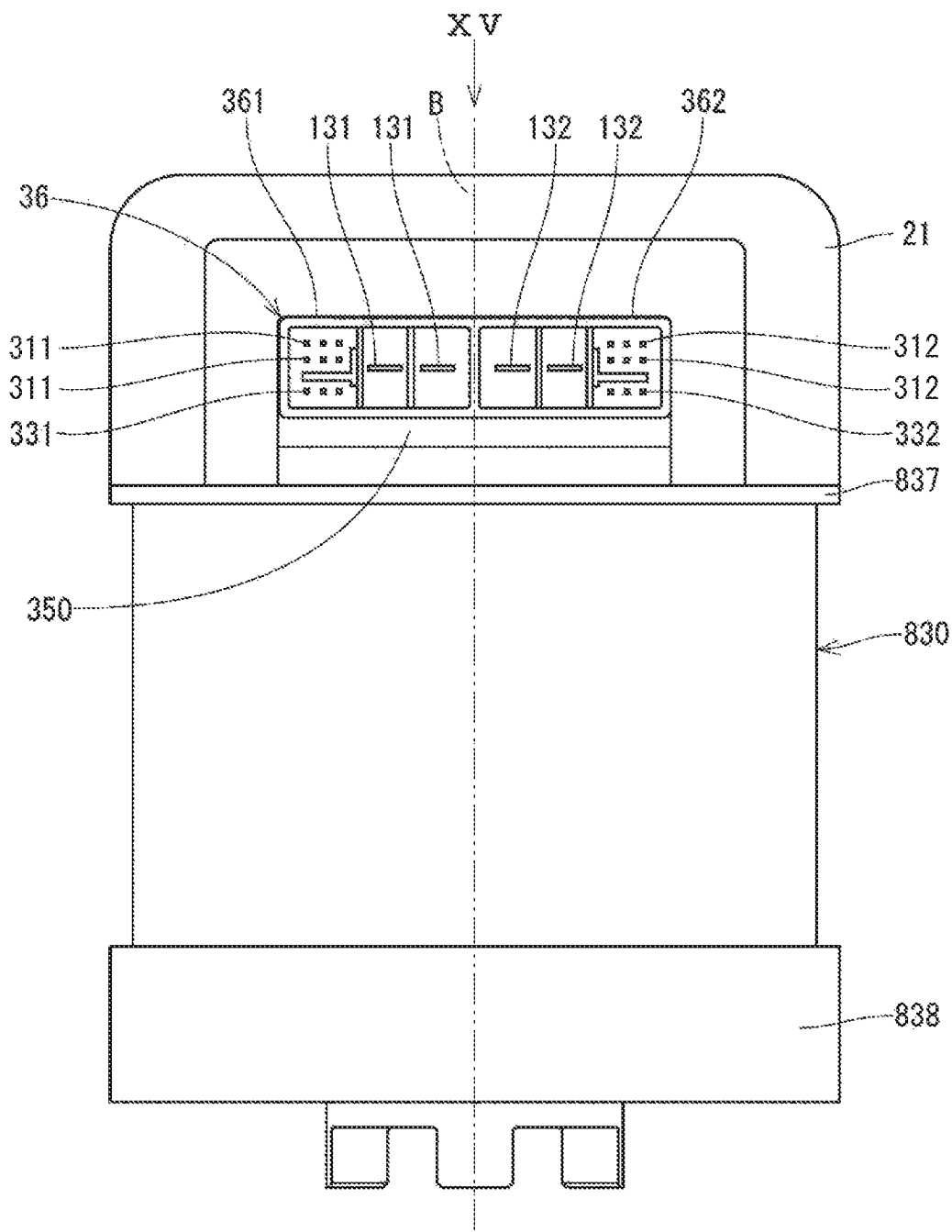
FIG. 14 is a front view of the drive device according to a second embodiment.
Figure 15:
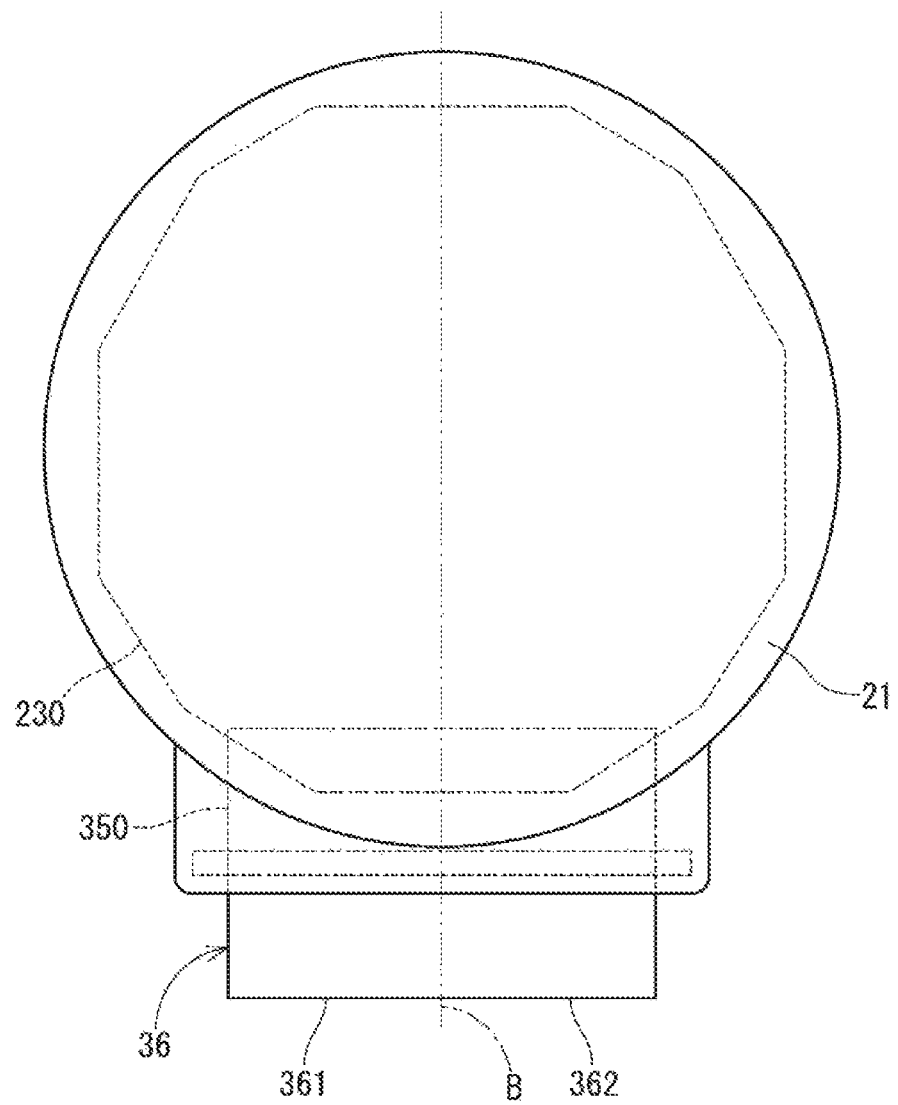
FIG. 15 is a top view of the drive device according to the second embodiment and is a view as seen from arrow XV of FIG. 14.
Figure 16:
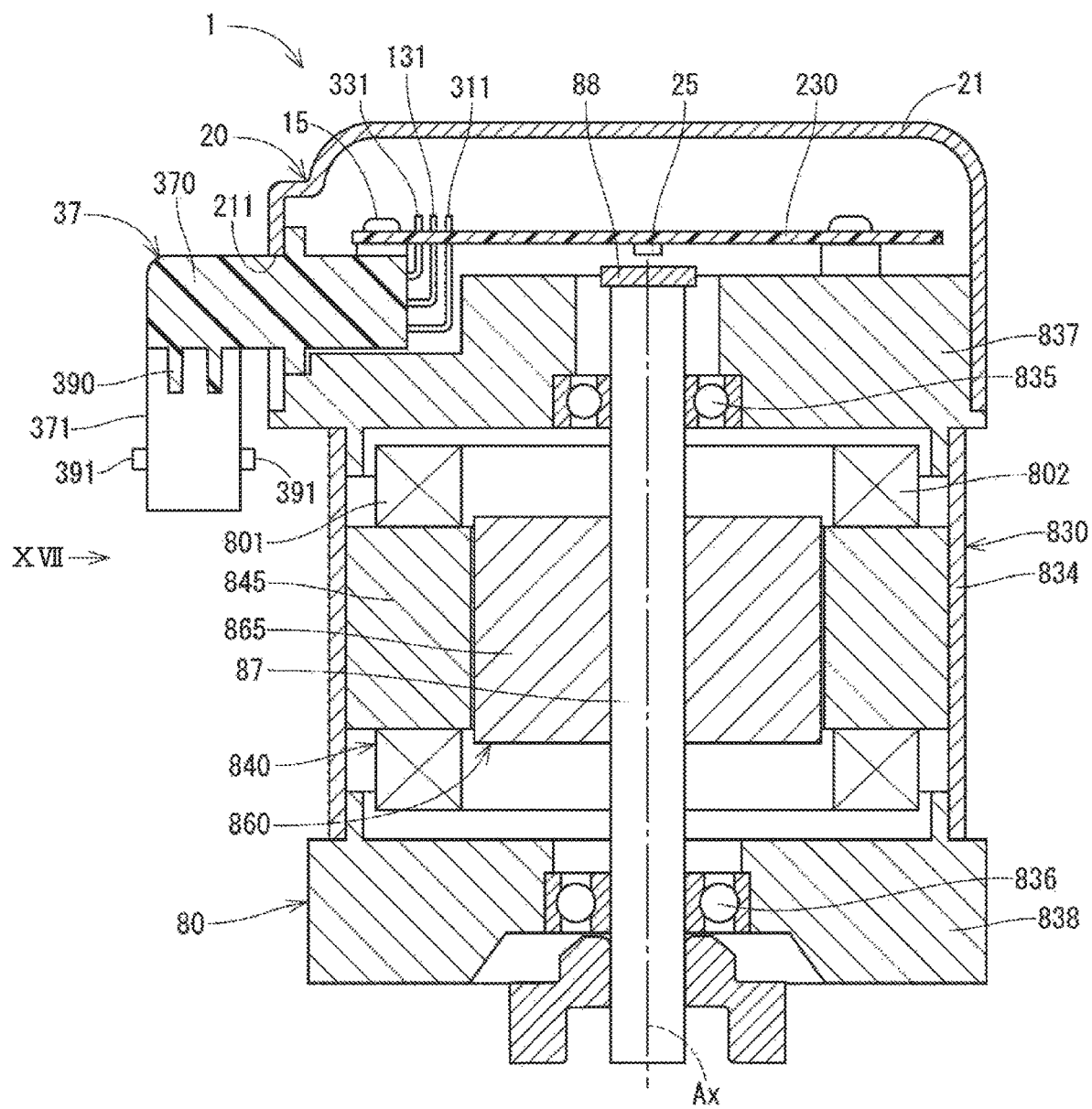
FIG. 16 is a vertical cross-sectional view of the drive device according to a third embodiment.
Figure 17:
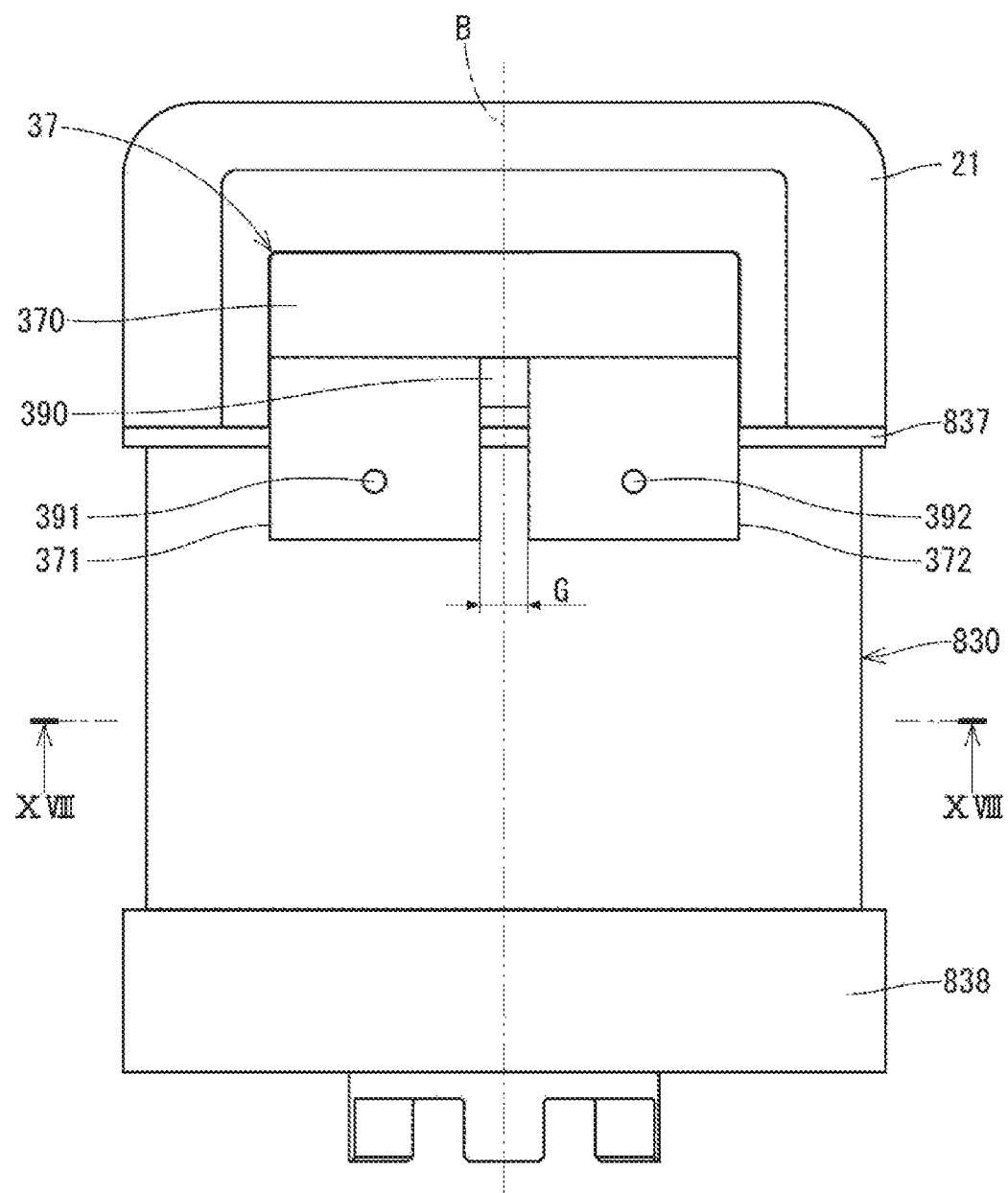
FIG. 17 is a front view of the drive device according to the third embodiment, and is a view as seen from arrow XVII in FIG. 16.

In the second embodiment, as shown in FIGS. 14 and 15, the first system connector 361 and the second system connector 362 of the connector portion 36 are integrally formed. Except for the above, the second embodiment has the same configuration as the first embodiment, and has the same effects as the first embodiment.

Third Embodiment

Figure 18:
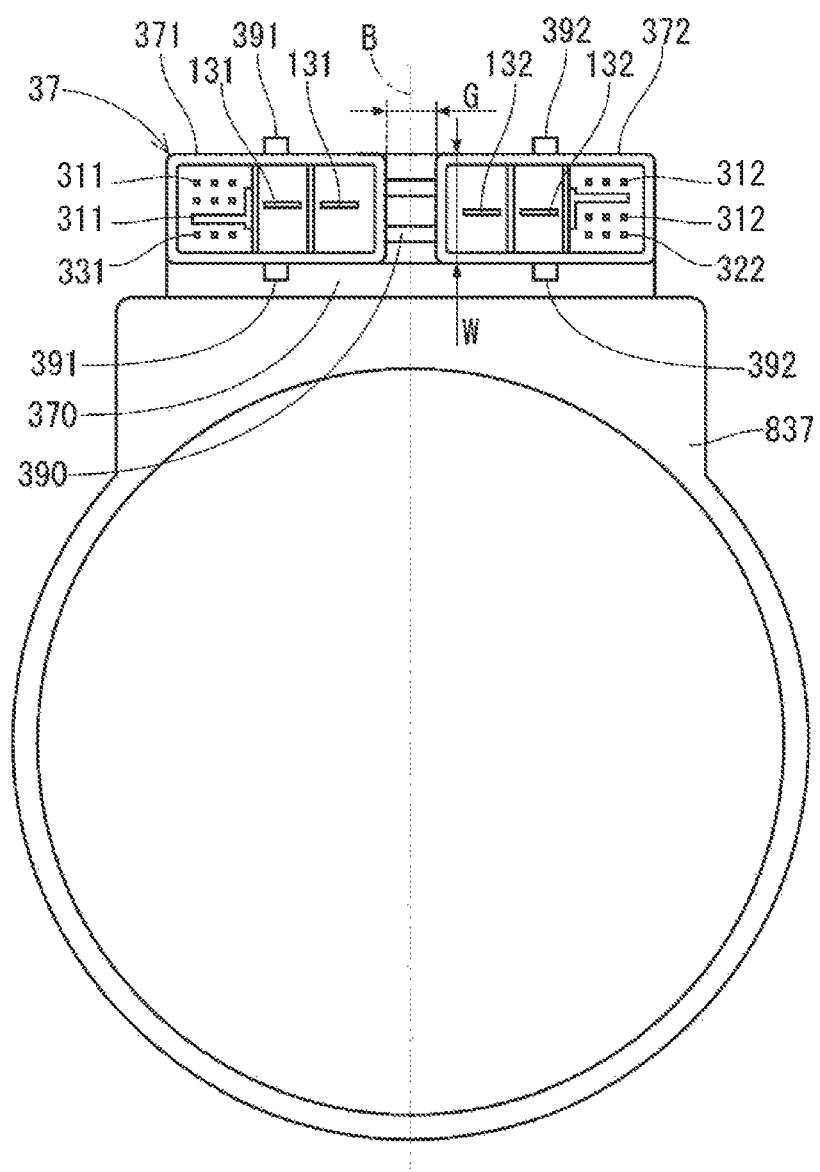
FIG. 18 is a lateral cross-sectional view of the drive device according to the third embodiment and is a cross-sectional view taken along line XVIII-XVIII of FIG. 17.
Figure 19:
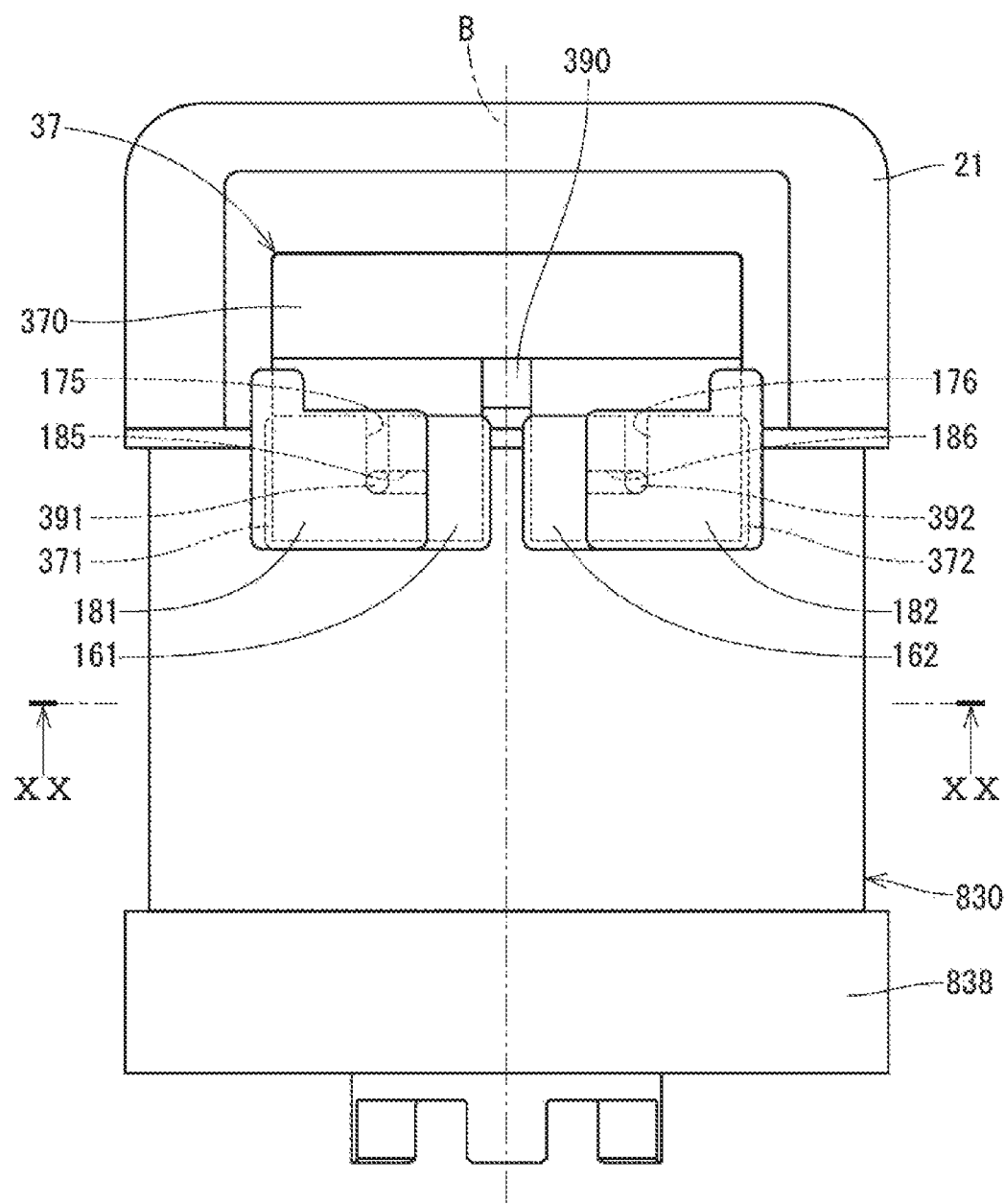
FIG. 19 is a view showing a front surface of the drive device and an external connector in a locked state according to the third embodiment.
Figure 20:
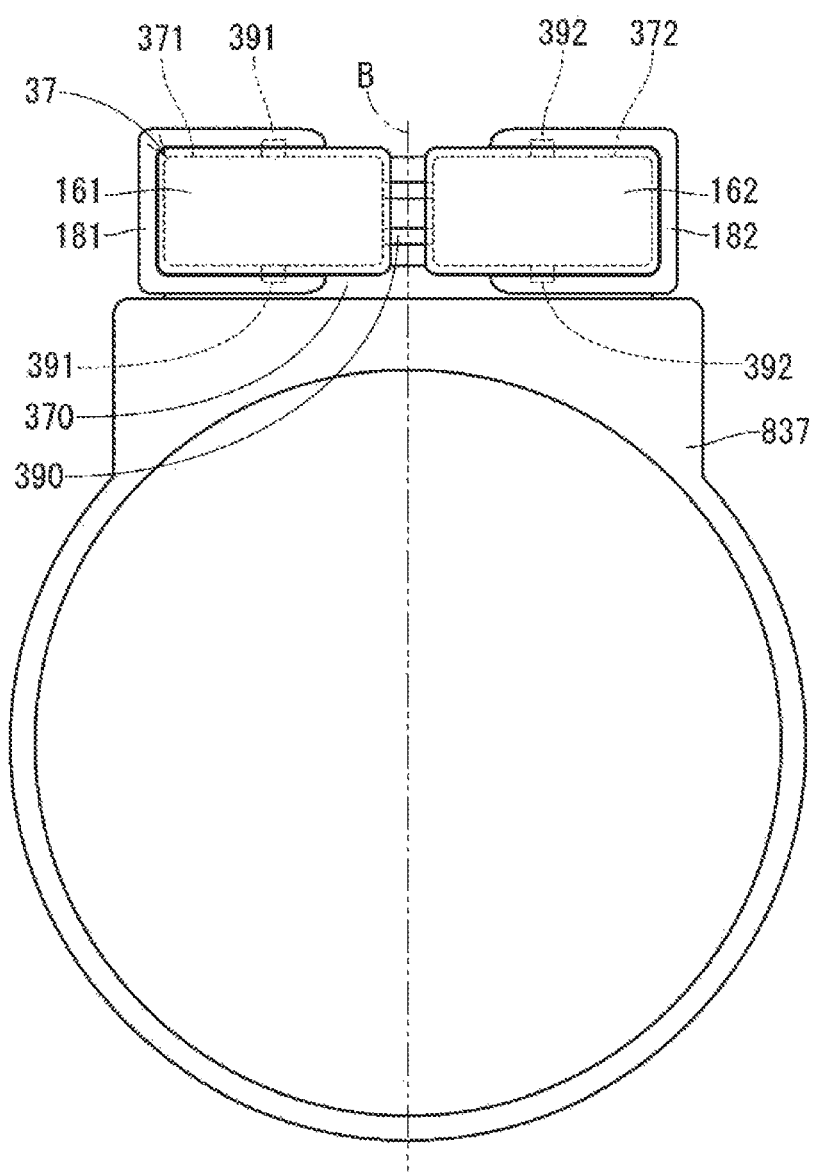
FIG. 20 is a diagram showing a lateral cross section of the drive device according to the third embodiment and the external connector in the locked state, and is a cross-sectional view taken along line XX-XX of FIG. 19.

In the third embodiment, as shown in FIGS. 16 to 20, the connectors 371 and 372 of the connector portion 37 project from the base portion 370 in the axial direction. An insertion/removal direction of the connectors 371 and 372 and a direction of the frontage are in the axial direction. Except for the above, the third embodiment has the same configuration as the first embodiment, and has the same effects as the first embodiment. In FIG. 18, constituent members of the motor 80 are omitted.

Fourth Embodiment

Figure 21:
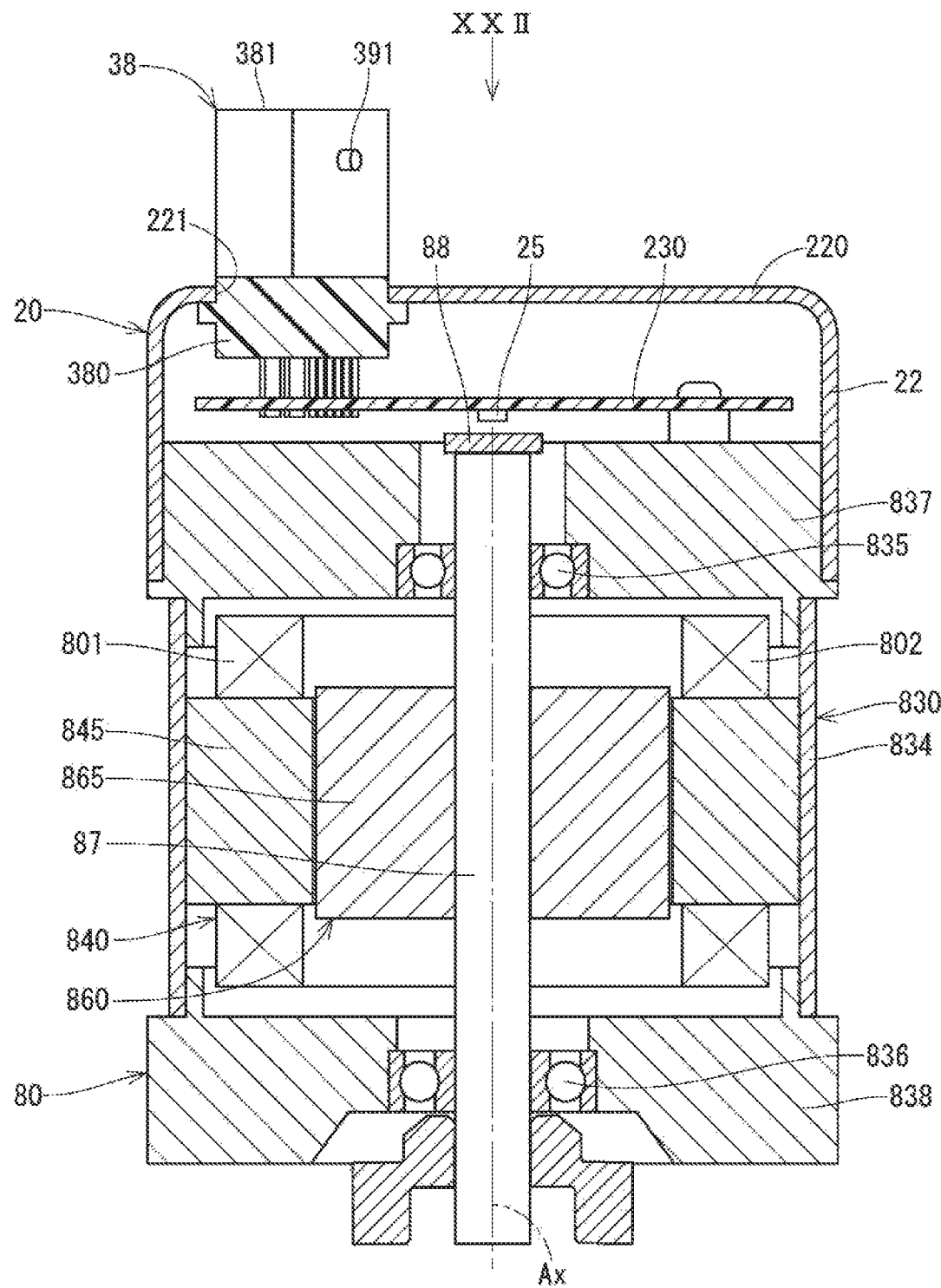
FIG. 21 is a vertical cross-sectional view of the drive device according to a fourth embodiment.
Figure 22:
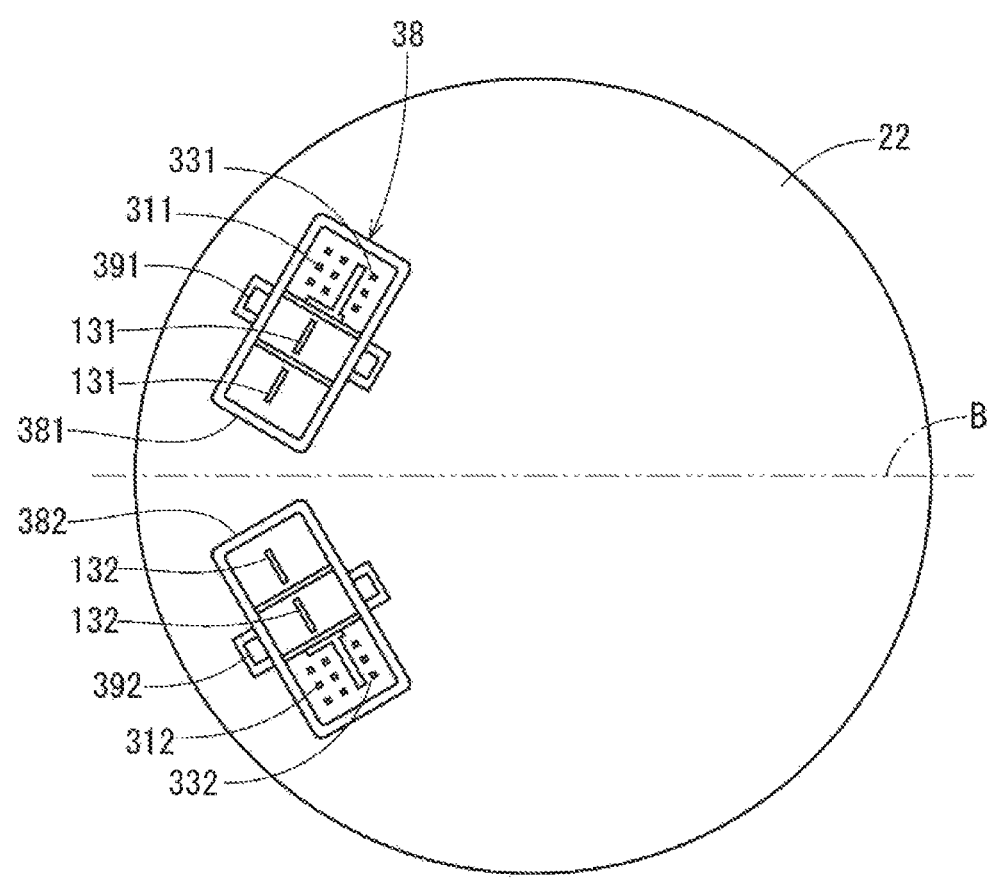
FIG. 22 is a top view of the drive device according to the fourth embodiment and is a view as seen from arrow XXII of FIG. 21.
Figure 23:
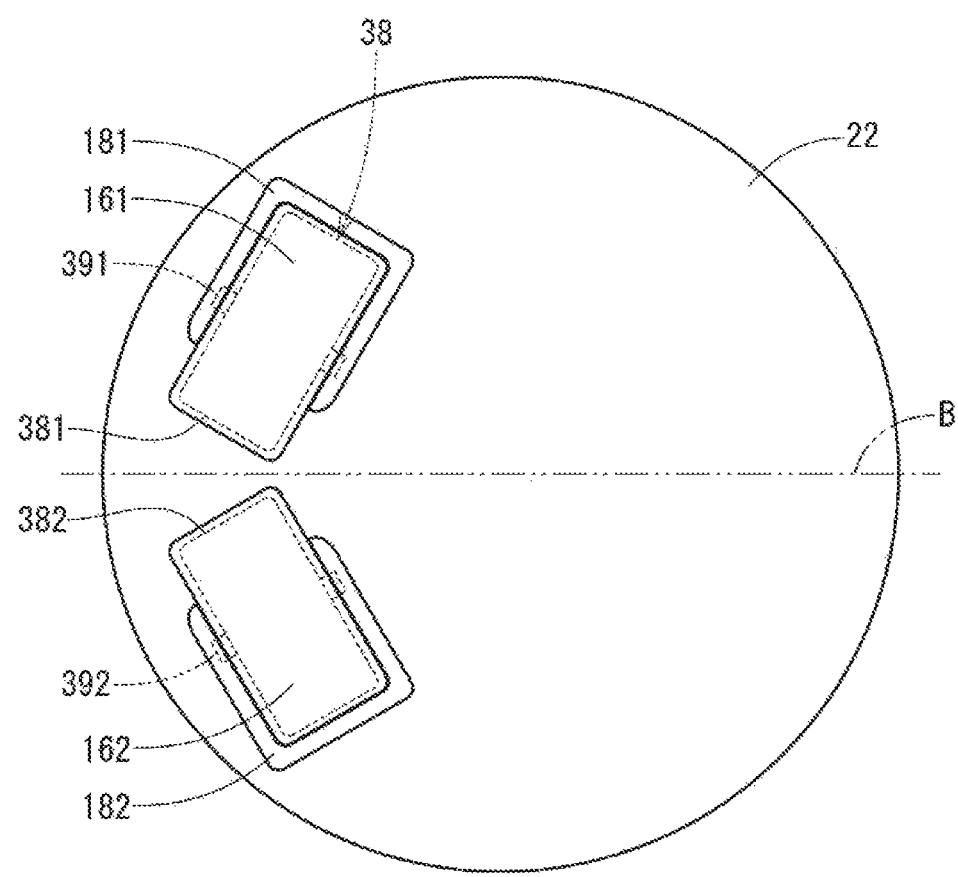
FIG. 23 is a view showing an upper surface of the drive device and the external connector in the locked state according to the fourth embodiment.

In the fourth embodiment, as shown in FIGS. 21 to 23, the connectors 381 and 382 of a connector portion 38 project from the base portion 380 in the axial direction through the opening 221 of the bottom portion 220 of the cover 22. An insertion/removal direction of the connectors 381 and 382 and a direction of the frontage are in the axial direction. The connectors 381 and 382 are arranged such that the angle formed by the long length directions of the frontages of those connectors is 90 degrees or more. Except for the above, the fourth embodiment has the same configuration as the first embodiment, and has the same effects as the first embodiment.

Other Embodiments

In another embodiment, electric power may be branched from one common power source and supplied to each system. A power supply terminal may be provided for each system and the power supply terminals may be arranged separately for each system connector. When a common power source is used, noise influence is more likely to occur than when a power source is provided for each system. However, similarly to the first embodiment, the power supply terminal is arranged closer to the center of the connector arrangement space, so that the influence of noise can be reduced.

In another embodiment, a position between the first system connector and the second system connector may deviate from the boundary position between the first system control portion and the second system control portion.

In the first to fourth embodiments, the base part of the connector portion and the connector are formed of separate members from the cover. On the other hand, in other embodiments, the base part, the connector, and the cover may be formed of the same member. In such a configuration, the terminals of the connector portion are connected to the circuit board of the control portion by, for example, press fitting, or the circuit board of the control portion is fixed to the connector portion, and the lead wires of the winding set are connected to the circuit board of the control portion by, for example, press fitting.

In other embodiments, the motor may have two sets of windings arranged in same phase. Moreover, the number of phases of the motor is not limited to three phase and may be four phases or more. Further, the motor to be driven is not limited to the AC brushless motor but may be a DC motor with brushes. In that case, an H-bridge circuit may be used as the power converter. Further, in other embodiments, the drive device is not limited to the electric power steering device, and may be applied to any other application.

The present disclosure has been described based on the embodiments. However, the present disclosure is not limited to the embodiments and structures. This disclosure also encompasses various modifications and variations within the scope of equivalents. Furthermore, various combination and formation, and other combination and formation including one, more than one or less than one element may be made in the present disclosure.

In an assumable example, there is known a drive device in which a motor and a control unit for controlling the motor are integrally provided. The assumable example discloses the drive device used in an electric power steering apparatus. In this drive device, the motor has winding sets in two system, and the control unit has an inverter corresponding to each winding set. The control unit includes two power supply connectors and two signal connectors.

By the way, when in the control unit, two systems are increased from one system, and the number of power supply connectors and signal terminal connectors is increased from one to two, the number of power supply lines and signal lines is also increased. Therefore, an arrangement of each line becomes complicated, and noise may increase due to the intersection of the power supply line and the signal line. In addition, a loop area of the power supply line becomes large, therefore, the noise influence on the signal line may increase.

The present disclosure has been made in view of the above points, and an object thereof is to provide a drive device in which noise increase is suppressed.

The drive device of the present disclosure includes a motor having winding sets in two systems, a control portion arranged coaxially with the motor and being configured to control a drive of the motor, and a connector portion for connecting to an external connector which is a connector of an external cable. The control portion includes a first system control portion configured to control energization of one winding set and a second system control portion configured to control energization of the other winding set.

The connector portion includes a first power supply terminal configured to supply power to the first system control portion, a first signal terminal configured to input a signal to the first system control portion, a first system connector configures to hold the first power supply terminal and the first signal terminal, a second power supply terminal configured to supply power to the second system control portion, a second signal terminal configured to input a signal to the second system control portion, and a second system connector configured to hold the second power supply terminal and the second signal terminal.

An insertion/removal direction of the first system connector is the same as the insertion/removal direction of the second system connector. The first system connector and the second system connector are arranged close to each other such that an interval between the connectors is smaller than a width in a short length direction of both connectors. The first power supply terminal is arranged closer to the second system connector with respect to the first signal terminal in a frontage of the first system connector. The second power supply terminal is arranged closer to the first system connector with respect to the second signal terminal in the frontage of the second system connector.

Since the first power supply terminal and the second power supply terminal are arranged close to the center of the connector arrangement space in this way, it becomes easy to avoid the intersection of the power supply line and the signal line. Moreover, an increase in a loop area of the power supply line can be suppressed. Therefore, the influence of noise on the signal line can be reduced.

What is claimed is:

1. A drive device comprising:
a motor having winding sets in two systems;
a control portion arranged coaxially with the motor and being configured to control a drive of the motor;
a connector portion configured to connect an external connector which is a connector of an external cable, wherein
the control portion includes a first system control portion configured to control energization of one of the winding sets, and a second system control portion configured to control energization of the other winding set,
the first system control portion and the second system control portion are mounted on one circuit board,
the connector portion includes a first power supply terminal configured to supply power to the first system control portion, a first signal terminal configured to input a signal to the first system control portion, a first system connector configures to hold the first power supply terminal and the first signal terminal, a second power supply terminal configured to supply power to the second system control portion, a second signal terminal configured to input a signal to the second system control portion, and a second system connector configured to hold the second power supply terminal and the second signal terminal,
an insertion/removal direction of the first system connector is the same as the insertion/removal direction of the second system connector,
the first system connector and the second system connector are arranged close to each other such that the interval between the connectors is smaller than the width in a short length direction of both connectors,
the first power supply terminal is arranged closer to the second system connector in the frontage of the first system connector than the first signal terminal, and
the second power supply terminal is arranged closer to the first system connector in the frontage of the second system connector than the second signal terminal.

2. The drive device according to claim 1, wherein
the first system connector and the second system connector are arranged such that the long length directions of the frontages of the connectors are aligned.

3. The drive device according to claim 1, wherein
the first system connector and the second system connector are arranged such that the long length directions of the frontages of the connectors are aligned, and are integrally formed.

4. The drive device according to claim 1, wherein
the first system control portion includes a first rotation angle detector that detects a rotation angle of the motor,
the second system control portion includes a second rotation angle detector that detects a rotation angle of the motor,
the first rotation angle detector has a power supply line and a signal line independent of the second rotation angle detector, and is packaged together with the second rotation angle detector to form a rotation angle sensor, and
the first system control portion and the second system control portion are separated by a boundary surface that passes through the rotation angle sensor and is parallel to an axis of the motor.

5. The drive device according to claim 4, wherein
the first system control portion includes a first power system component connected to the first power supply terminal, and a first control system component connected to the first signal terminal,
the second system control portion includes a second power system component connected to the second power supply terminal, and a second control system component connected to the second signal terminal, and
the first power system component and the second power system component are located closer to the first system connector and the second system connector on the circuit board with respect to the first control system component and the second control system component.

6. The drive device according to claim 4, wherein
on one side with respect to the boundary surface, the first power supply terminal and the first signal terminal are arranged in order from the boundary surface,
on the other side with respect to the boundary surface, the second power supply terminal and the second signal terminal are arranged in order from the boundary surface.

* * * * *